US012462642B2

(12) United States Patent
Arrowsmith et al.

(10) Patent No.: US 12,462,642 B2
(45) Date of Patent: Nov. 4, 2025

(54) GAMING MACHINES AND METHODS FOR OPERATING GAMING MACHINES

(71) Applicant: Konami Gaming, Inc., Las Vegas, NV (US)

(72) Inventors: Ian Arrowsmith, Las Vegas, NV (US); John Pariseau, Las Vegas, NV (US); Kim Yost, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 406 days.

(21) Appl. No.: 17/943,920

(22) Filed: Sep. 13, 2022

(65) Prior Publication Data

US 2023/0088957 A1 Mar. 23, 2023

Related U.S. Application Data

(60) Provisional application No. 63/247,624, filed on Sep. 23, 2021.

(51) Int. Cl.
*G07F 17/32* (2006.01)

(52) U.S. Cl.
CPC ...... *G07F 17/3227* (2013.01); *G07F 17/3244* (2013.01)

(58) Field of Classification Search
CPC ............. G07F 17/3227; G07F 17/3244; G07F 17/3267
See application file for complete search history.

(56) References Cited

U.S. PATENT DOCUMENTS

| | | | | |
|---|---|---|---|---|
| 10,692,328 B2 * | 6/2020 | Berman | .............. | G07F 17/3267 |
| 2004/0053666 A1 * | 3/2004 | Vancura | .................. | G07F 17/32 463/16 |
| 2014/0011565 A1 * | 1/2014 | Elias | .................. | G07F 17/3267 463/20 |
| 2015/0087391 A1 * | 3/2015 | Kitamura | ............ | G07F 17/3213 463/20 |

* cited by examiner

*Primary Examiner* — Kevin Y Kim
(74) *Attorney, Agent, or Firm* — Howard & Howard Attorneys PLLC

(57) ABSTRACT

A gaming machine is described herein. The gaming machine includes a processor programmed to execute an algorithm to display an animated sequence of computer-generated images on a display device including the steps of rendering a plurality of games on a game screen with each game including a plurality of virtual reels, and animating each of the plurality of virtual reels to spin and stop to display an outcome of each corresponding game. The processor also displays a credit award feature by determining a number of free games associated with each corresponding game, determining a credit award range based on the associated number of free games, and animating a credit award selection screen onto the game screen overlaid across a portion of each corresponding game. The credit award selection screen including a selectable credit award icon displaying the determined credit award range.

18 Claims, 32 Drawing Sheets

88

| Reel Strip Layout | | | | | |
|---|---|---|---|---|---|
| Stop Position | 1st reel | 2nd reel | 3rd reel | 4th reel | 5th reel |
| 0 | PIC-d | PIC-c | PIC-a | PIC-b | PIC-c |
| 1 | Q | K | J | PIC-b | PIC-a |
| 2 | 9 | Prize | A | Prize | Inner |
| 3 | Inner | 10 | A | A | PIC-a |
| 4 | Q | PIC-a | Prize | PIC-d | PIC-a |
| 5 | K | PIC-a | PIC-b | 10 | 10 |
| 6 | PIC-c | PIC-a | A | PIC-d | PIC-c |
| 7 | J | K | K | 9 | PIC-c |
| 8 | J | Q | 10 | Q | PIC-c |
| 9 | Inner | WILD | J | WILD | A |
| 10 | Q | WILD | PIC-d | WILD | PIC-b |
| 11 | PIC-a | A | PIC-d | PIC-b | J |
| 12 | A | K | PIC-d | 10 | Prize |
| 13 | A | A | A | PIC-c | K |
| | | | Inner | PIC-c | 9 |
| 37 | 10 | J | | | |
| 38 | PIC-c | J | 10 | PIC-c | K |
| 39 | J | PIC-b | 10 | Inner | PIC-b |
| 40 | Prize | PIC-b | Inner | PIC-b | Prize |
| 41 | PIC-b | K | 9 | PIC-b | PIC-b |
| 42 | K | K | 9 | 9 | 10 |
| 43 | J | Prize | 9 | A | A |
| 44 | PIC-a | 9 | Prize | A | PIC-d |
| 45 | A | 9 | J | 10 | A |
| 46 | K | 9 | J | Inner | Inner |
| 47 | A | Inner | PIC-b | PIC-a | Q |
| 48 | PIC-b | PIC-a | K | PIC-a | PIC-d |
| 49 | Q | PIC-a | PIC-a | PIC-a | PIC-a |
| 50 | PIC-d | 10 | Q | Q | Q |
| 51 | PIC-d | 10 | 9 | 9 | 9 |
| 52 | 10 | PIC-d | PIC-c | PIC-c | PIC-c |
| 53 | K | PIC-d | K | K | PIC-c |
| 54 | PIC-c | PIC-d | PIC-c | PIC-c | PIC-c |
| 55 | PIC-c | 10 | Q | Q | Q |
| 56 | 9 | J | K | K | K |
| 57 | 9 | J | K | K | K |

94 96 98 100 102 90 92 104 104 106 84 84

FIG. 11

108

106

| Stop Position | Random Number Range |
|---|---|
| 1 | 1-50 |
| 2 | 51-100 |
| 3 | 101-150 |
| 4 | 151-200 |
| 5 | 201-250 |
| 6 | 251-300 |
| 7 | 301-350 |
| 8 | 351-400 |
| 9 | 401-450 |
| 10 | 451-500 |
| 11 | 501-550 |
| 12 | 551-600 |
| 13 | 601-650 |
| 14 | 651-700 |
| 15 | 701-750 |
| 16 | 751-800 |
| 17 | 801-850 |
| 18 | 851-900 |
| 19 | 901-950 |
| 20 | 951-1000 |

FIG. 12

122

| Credit Award Range | Credit Award Multiplier | Weight | Selection Probability | Random Number Range |
|---|---|---|---|---|
| 130 MIN | 0.1 | 10 | 10% | 000-009 |
| ↓ | 0.5 | 22 | 22% | 010-031 |
| | 1.0 | 52 | 52% | 032-083 |
| | 2.0 | 12 | 12% | 084-095 |
| 132 MAX | 2.84 | 4 | 4% | 096-099 |

FIG. 16

FIG. 17
10
4 x
THE
FREE GAMES!!
CHINA SHORES
65
14

FIG. 23
65
14
FREE GAME
OF
450
138
$6.00
120
BET
1 CREDIT PER LINE
QuickPlay
SELECT DENOM
5¢
118

FIG. 25
Which game(s) do you want to QuickPlay?
Free Games will end for each selected Game and a random Credit Prize will be awarded.
Unselected Games will continue Free Games after QuickPlay award.
QuickPlay
CANCEL
RETURN TO FREE GAMES
KONAMI

FIG. 26
112
120
65
Which game(s) do you want to QuickPlay?
GAME
GAME
GAME
GAME
Free Games will end for each selected Game and
a random Credit Prize will be awarded.
Unselected Games will continue Free Games after
QuickPlay award.
CANCEL
RETURN TO
FREE GAMES
65
138
TOTAL WON
8900
CREDITS

GAMING MACHINES AND METHODS FOR OPERATING GAMING MACHINES

CROSS-REFERENCE TO RELATED APPLICATION

This application claims the benefit of U.S. Provisional Patent Application Ser. No. 63/247,624 filed Sep. 23, 2021, the disclosure of which is hereby incorporated by reference in its entirety.

TECHNICAL FIELD

The present invention relates to gaming machines and control methods for operating gaming machines.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine.

The present invention solves one or more of the problems identified above.

SUMMARY OF INVENTION

In one aspect of the present invention, a gaming machine is provided. The gaming machine includes a cabinet, a display device mounted to the cabinet, and a game control unit operably coupled to the display device. The game control unit includes a processor programmed to execute an algorithm to display an animated sequence of computer-generated images on the display device including the steps of rendering a plurality of games on a game screen with each game including a plurality of virtual reels, and animating each of the plurality of virtual reels to spin and stop to display an outcome of each corresponding game. The processor also displays a credit award feature by determining a number of free games associated with each corresponding game, determining a credit award range based on the associated number of free games, and animating a credit award selection screen onto the game screen overlaid across a portion of each corresponding game. The credit award selection screen including a selectable credit award icon displaying the determined credit award range.

In another aspect of the present invention, a method of operating a gaming machine is provided. The gaming machine includes a display device mounted to a cabinet and a game control unit including a processor operably coupled to the display device. The method includes the processor performing an algorithm to display an animated sequence of computer-generated images on the display device including the steps of rendering a plurality of games on a game screen with each game including a plurality of virtual reels, and animating each of the plurality of virtual reels to spin and stop to display an outcome of each corresponding game. The processor also displays a credit award feature by determining a number of free games associated with each corresponding game, determining a credit award range based on the associated number of free games, and animating a credit award selection screen onto the game screen overlaid across a portion of each corresponding game. The credit award selection screen including a selectable credit award icon displaying the determined credit award range.

In a further aspect of the present invention, a non-transitory computer-readable storage media having computer-executable instructions embodied thereon to operate a gaming machine is provided. The gaming machine includes a display device including a touchscreen, and a processor operably coupled to the display device. The computer-executable instructions cause the processor to perform an algorithm to display an animated sequence of computer-generated images on the display device including the steps of rendering a plurality of games on a game screen with each game including a plurality of virtual reels, and animating each of the plurality of virtual reels to spin and stop to display an outcome of each corresponding game. The processor also displays a credit award feature by determining a number of free games associated with each corresponding game, determining a credit award range based on the associated number of free games, and animating a credit award selection screen onto the game screen overlaid across a portion of each corresponding game. The credit award selection screen including a selectable credit award icon displaying the determined credit award range.

BRIEF DESCRIPTION OF DRAWINGS

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIG. 11 is an illustration of exemplary reel strip data file for use in generating virtual reels shown in FIG. 4 with symbol arrangements showing the order of symbols displayed on the display area of the game, according to an embodiment of the present invention;

FIG. 12 is an illustration of a reel stop position data file that may be used to execute the game, according to an embodiment of the present invention;

FIG. 16 is an illustration of a data file that may be used to execute the algorithm shown in FIG. 15.

Corresponding reference characters indicate corresponding parts throughout the drawings.

DETAILED DESCRIPTION OF EMBODIMENTS

Figure 1A:
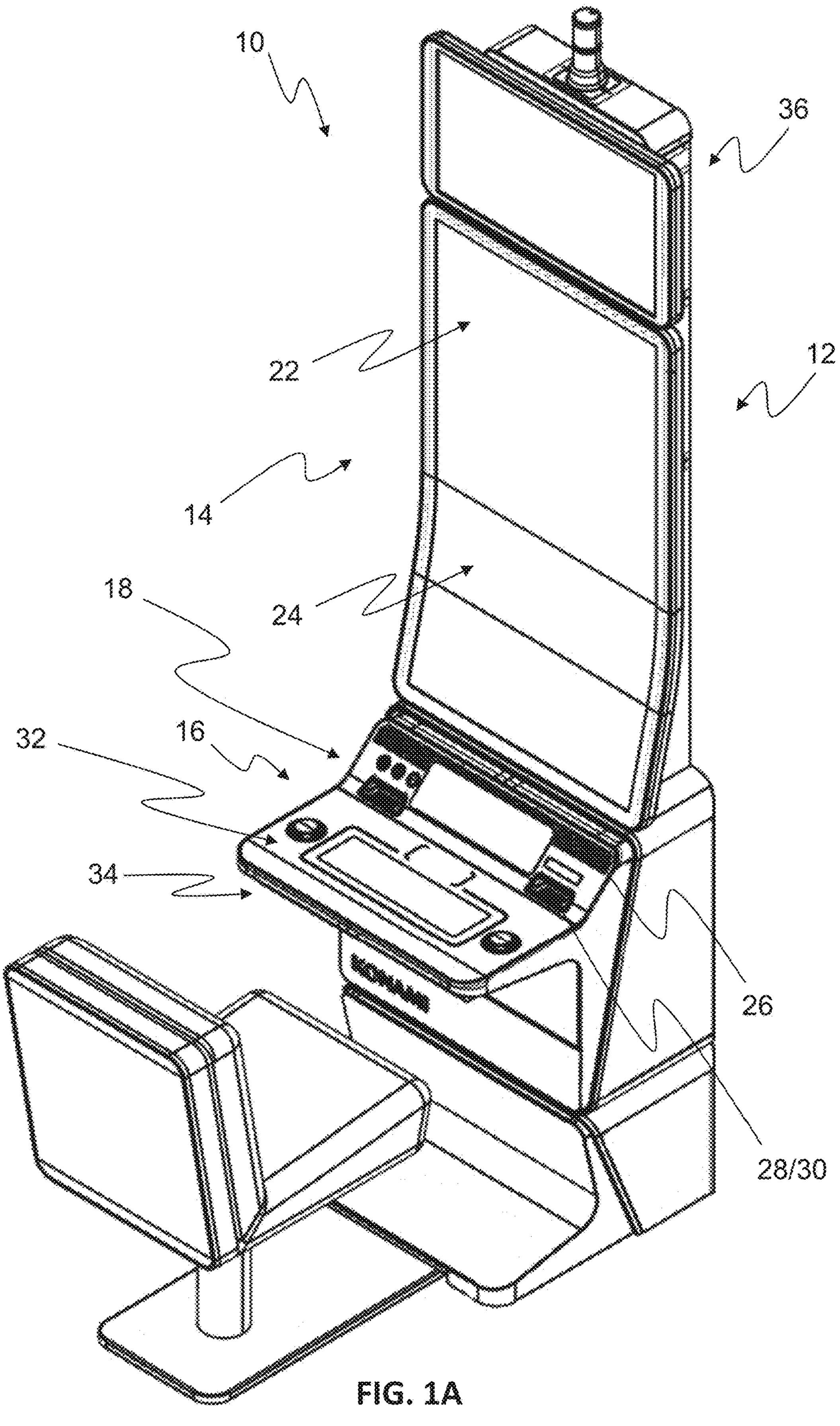
FIG. 1A is a perspective view of a gaming machine, according to an embodiment of the present invention.
Figure 1B:
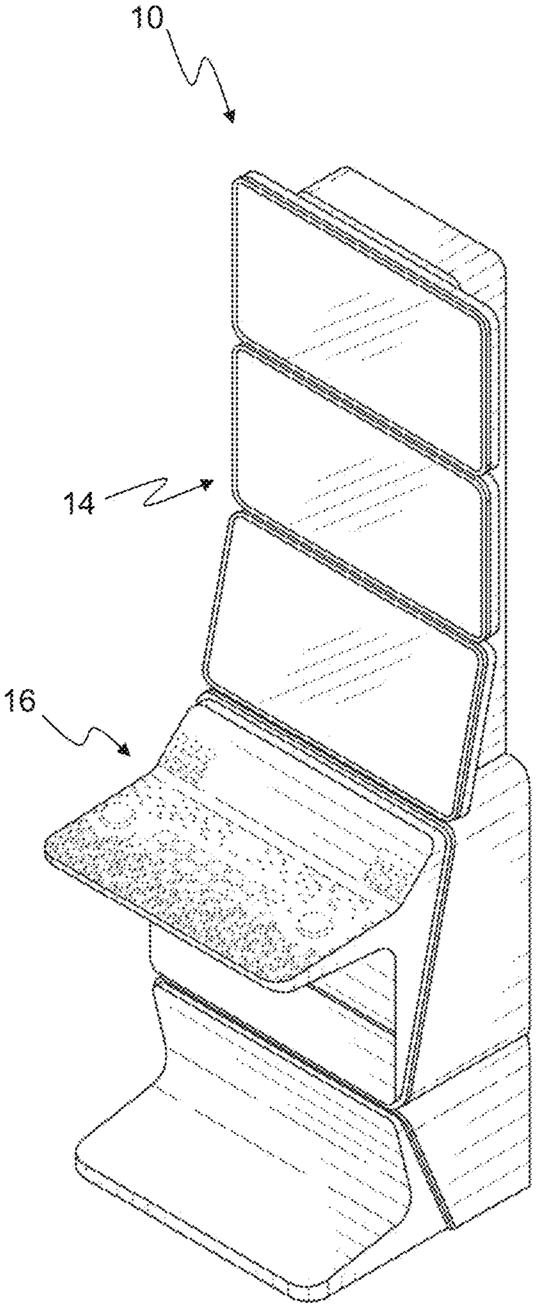
FIGS. 1B-1G are perspective views of the gaming machine, according to other embodiments of the present invention.
Figure 1C:
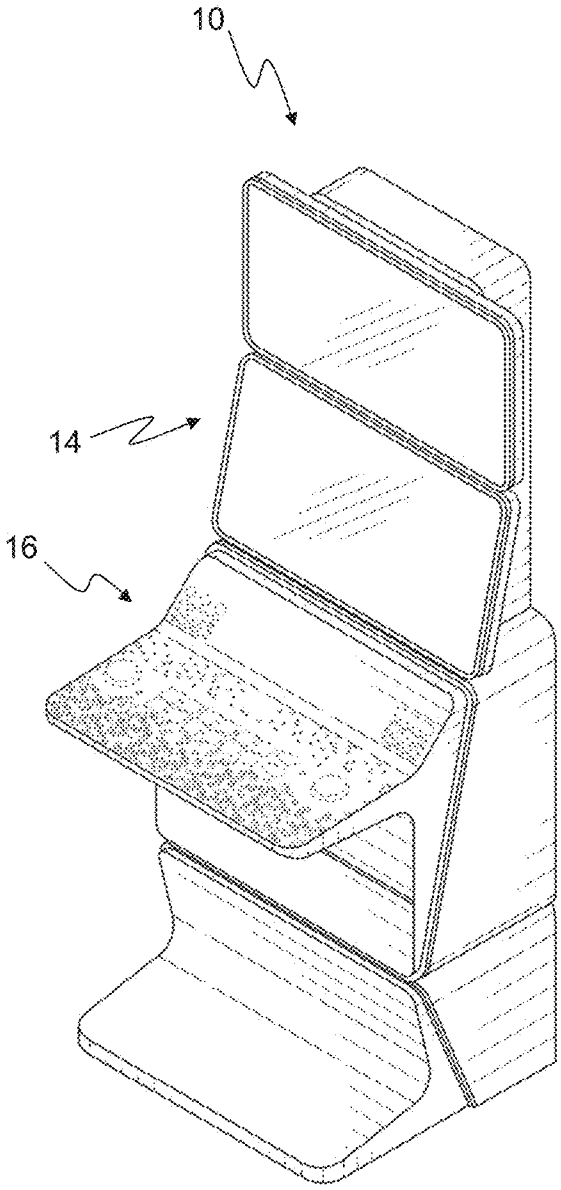
Figure 1D:
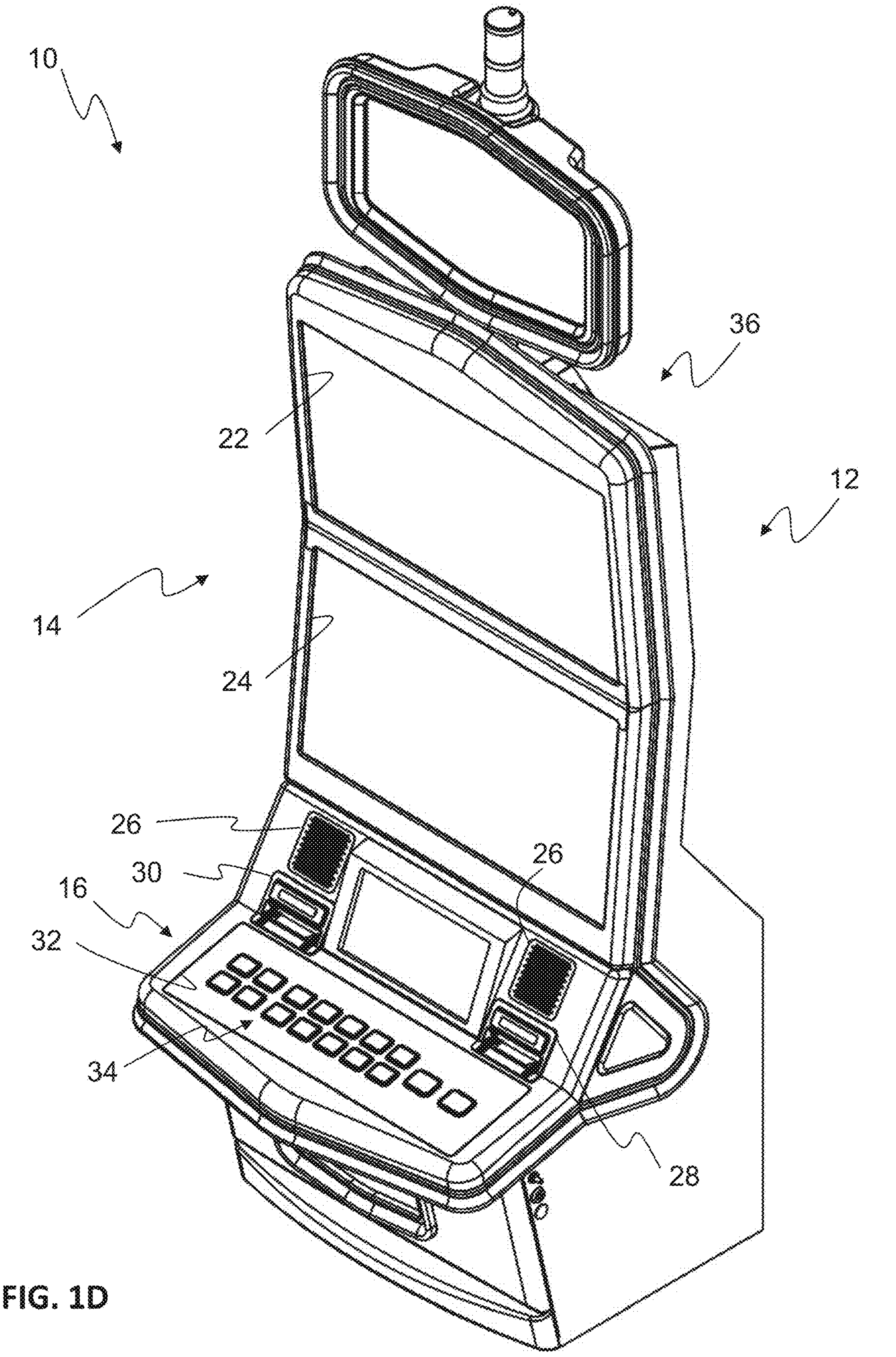
Figure 1E:
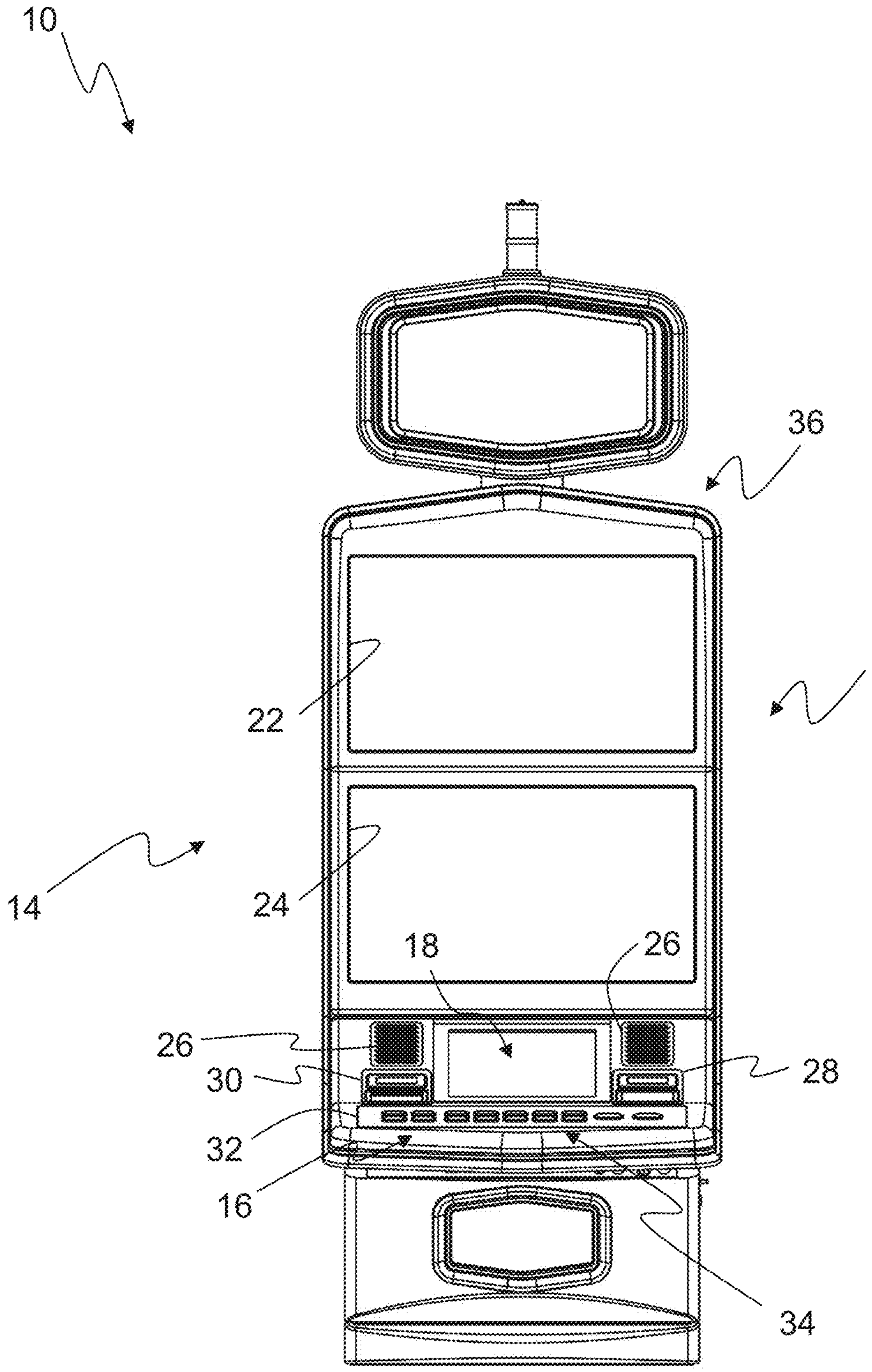

With reference to the drawings and in operation, the present invention is directed towards a gaming machine, a control method for a gaming machine, and a program for a gaming machine and/or mobile computing device that provides a game to a player. The gaming machine according to the present embodiment, receives a predetermined game value from the player, generates a game result, and provides a payout to the player according to the game result and one or more pay tables. The gaming machine includes a gaming cabinet that includes a display device and a user input device. The display device includes a display configured to display computer generated graphics. The user input device includes a plurality of input buttons that allows a player to initiate game play and interact with video images being displayed on the display device. The gaming machine includes a control unit having a computer processor that is programmed generate and display a structured graphic user interface displayed on the display device using computer generated graphics. The structure graphic user interface includes a plurality of virtual reels displaying game symbols within a grid. The control unit is also programmed to animate the virtual reels to simulate spinning the virtual through the grid, and stop the virtual reels to reveal an outcome of a game. The control unit is also programmed to generate and present additional computer animations in specific animated sequences to display bonus features associated with the game.

Referring to FIGS. 1A-1D, in the illustrated embodiment, the gaming machine 10 includes a cabinet 12 providing a display unit 14 and a control panel 16 and may also house a player tracking or ranking unit 18. The cabinet 12 also houses a game control unit 20 (see FIG. 2) that controls each part (see below). The control unit 20 also implements a random number generator (RNG) that is used during operation of the game. Each configuration is described below.

Figure 1F:
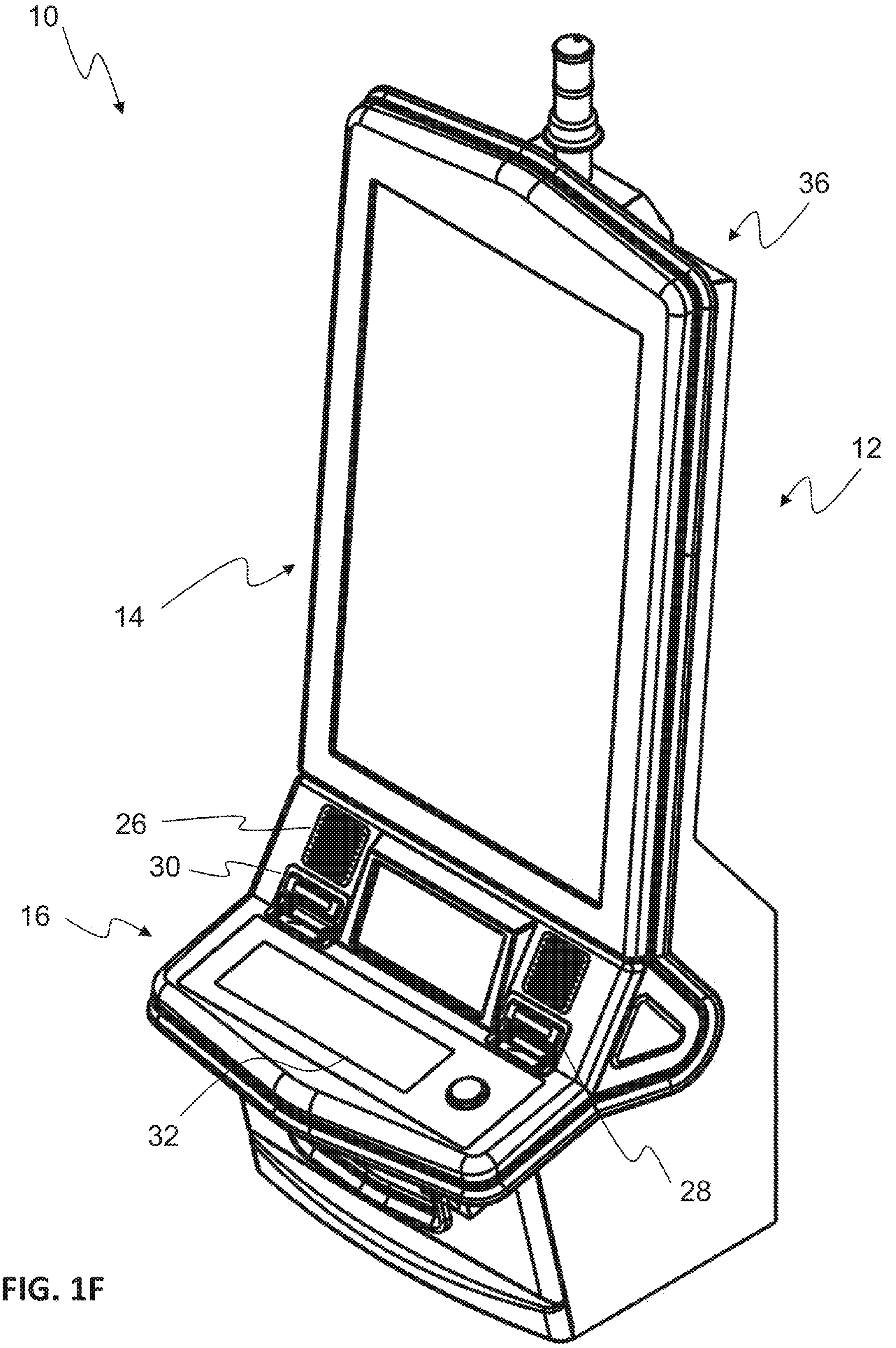
Figure 1G:
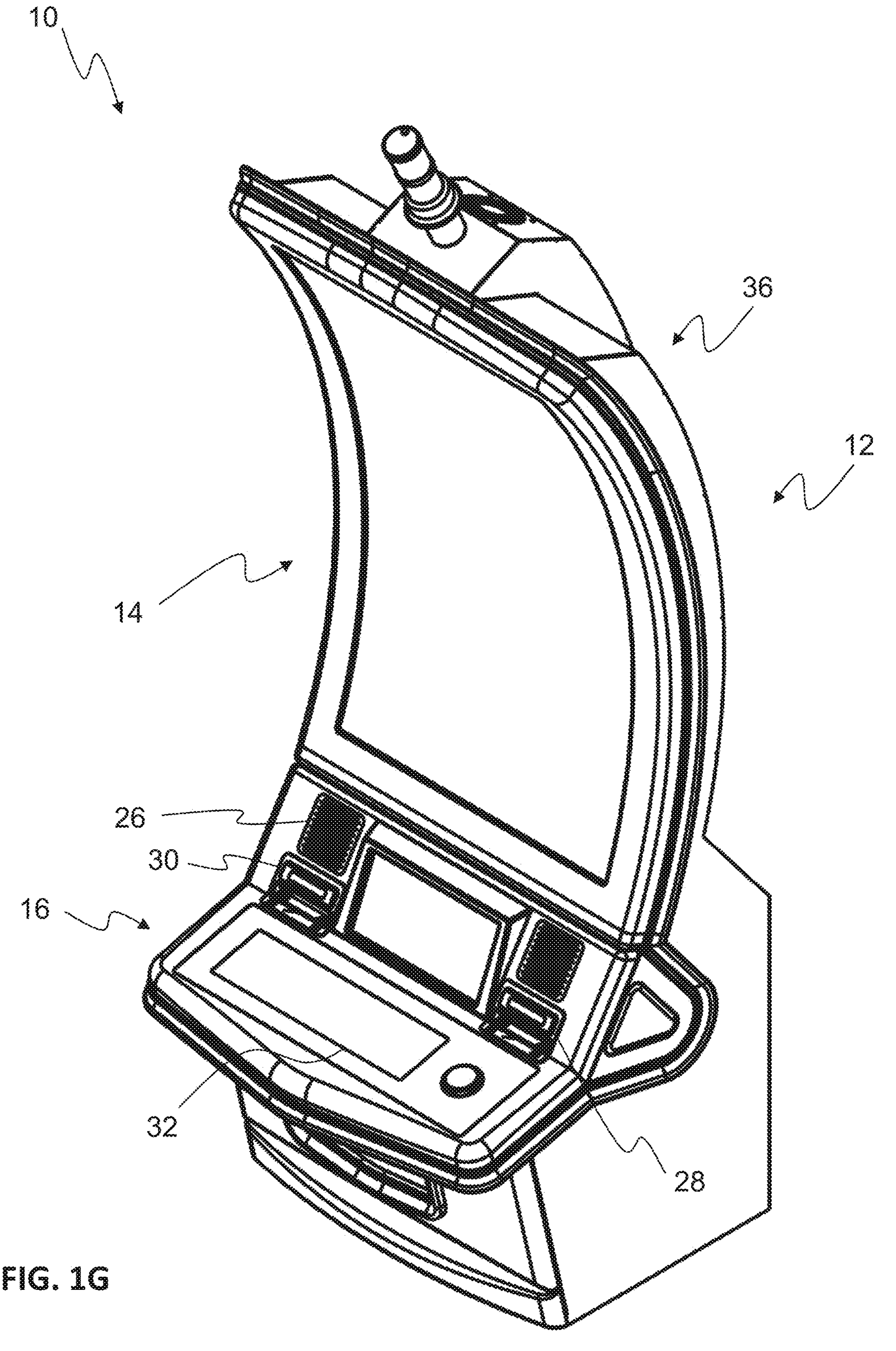

The display unit 14 may be liquid crystal display devices and/or organic EL display devices and the like, and by controlling via each control unit 20, the display area mentioned below functions as a display unit 14 provided to the player. In some embodiments, the display unit 14 may include an upper display 22 and a lower display 24. As shown FIGS. 1A, 1F, and 1G, in some embodiments, the upper and lower displays 22, 24 are shown on a single display device. In other embodiments, as shown in FIGS. 1B-1E, the upper and lower displays 22, 24 may be shown on multiple display devices. In some embodiments, the display unit 14 may include a touchscreen to enable a player to interact with images displayed on the display unit 14.

Speakers 26 are provided on the left and right of the cabinet 12, and by controlling via the control unit 20, sound is provided to the player. On the control panel 16, a bill/ticket identification device 28, a printer device 30, and an operation unit 32 are provided.

The player tracking unit 18 may be housed on the center of the front surface of the cabinet 12 below the display unit 14. The player tracking unit 18 has a card reader that recognizes a player identification card, a display that presents data to the player, and a keypad that receives input by the player. This type of player tracking unit 18 reads information recorded on the player identification card inserted by the player into the card reader, and displays the information and/or information acquired by communicating with the external system on the display, by cooperatively operating with the control unit 20 mentioned below or an external system. Further, input from the player is received by the keypad, the display is changed according to the input, and communication with the external system is carried out as necessary.

The bill/ticket identification device 28 is disposed on the control panel 16 in a state where the insertion opening that a bill/ticket is inserted into is exposed, an identification part that identifies a bill/ticket by various sensors on the inside of the insertion opening is provided, and a bill/ticket storage part is provided on the outgoing side of the identification part. The bill/ticket identification device 28, receives and identifies bills/tickets (including vouchers and coupons) that are the game value as a game executing value, and notifies the control unit 20 mentioned below.

The printer device 30 is disposed on the control panel 16 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer device 30, under the control of the control unit 20 mentioned below, prints information on paper and outputs a ticket according to credit payout processing from the gaming machine 10. The output ticket can use the payout credit as game play by being inserted into the bill/ticket identification device 28 of another gaming machine, or, can be exchanged for cash by a kiosk terminal inside of the casino or a casino cage.

The operation unit 32 receives the operation of the player. The operation unit 32 includes a group of buttons 34 that receives various instructions from the player on the gaming machine 10. The operation unit 32, for example, may include a spin button and a group of setting buttons. The spin button receives an instruction to start (start rotating the reel) an instance of the game. The group of setting buttons 34 includes a group of bet buttons, a denomination button, a group of line-designation buttons, a max bet button, and a payout button and the like. The group of bet buttons receives an instruction operation regarding the bet amount of credits (bet number) from the player. The group of line-designation buttons receive an instruction operation that designate a pay line subjected to a line judgment below from the player. The max bet button receives an instruction operation regarding the bet of the maximum amount of credits that can be bet at one time from the player. The payout button receives an instruction operation instructing a credit payout accumulated in the gaming machine 10. The gaming machine 10 also includes illumination devices 36 that provides decorative lighting to the gaming machine 10.

In one embodiment, the control panel 16 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 14 and/or the player tracking unit 18, the bill/ticket identification device 28, the operation unit 32, the player tracking unit 18, a coin slot, a ticket in ticket out (TITO) system, a bill acceptor, and/or any suitable device that enables the gaming machine 10 to receive media associated with a monetary value and establish a credit balance for use in playing the gaming machine 10. In one embodiment, the acceptor device may be configured to receive physical media such as, for example, a coin, a medal, a ticket, a card, a bill, currency, and/or any suitable physical media that enables the gaming machine 10 to function as described herein. The acceptor device may also be configured to accept virtual media such as, for example, a player tracking account, a virtual credit balance, reward points, gaming credits, bonus points, and/or any suitable virtual media that enables the gaming machine 10 to function as described herein.

For example, in one embodiment, the coin slot may include an opening that is configured to receive coins and/or tokens deposited by the player into the gaming machine 10. The control unit 20 converts a value of the coins and/or tokens to a corresponding amount of gaming credits that are used by the player to wager on games played on the gaming machine 10. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 10. In one embodiment, the bill acceptor also includes a printer (not shown) that is configured to dispense a printed voucher ticket that includes information indicative of an amount of credits and/or money paid out to the player by the gaming machine 10 during a gaming session. The voucher ticket may be used at other gaming devices, or redeemed for cash, and/or other items as part of a casino cashless system.

Figure 2:
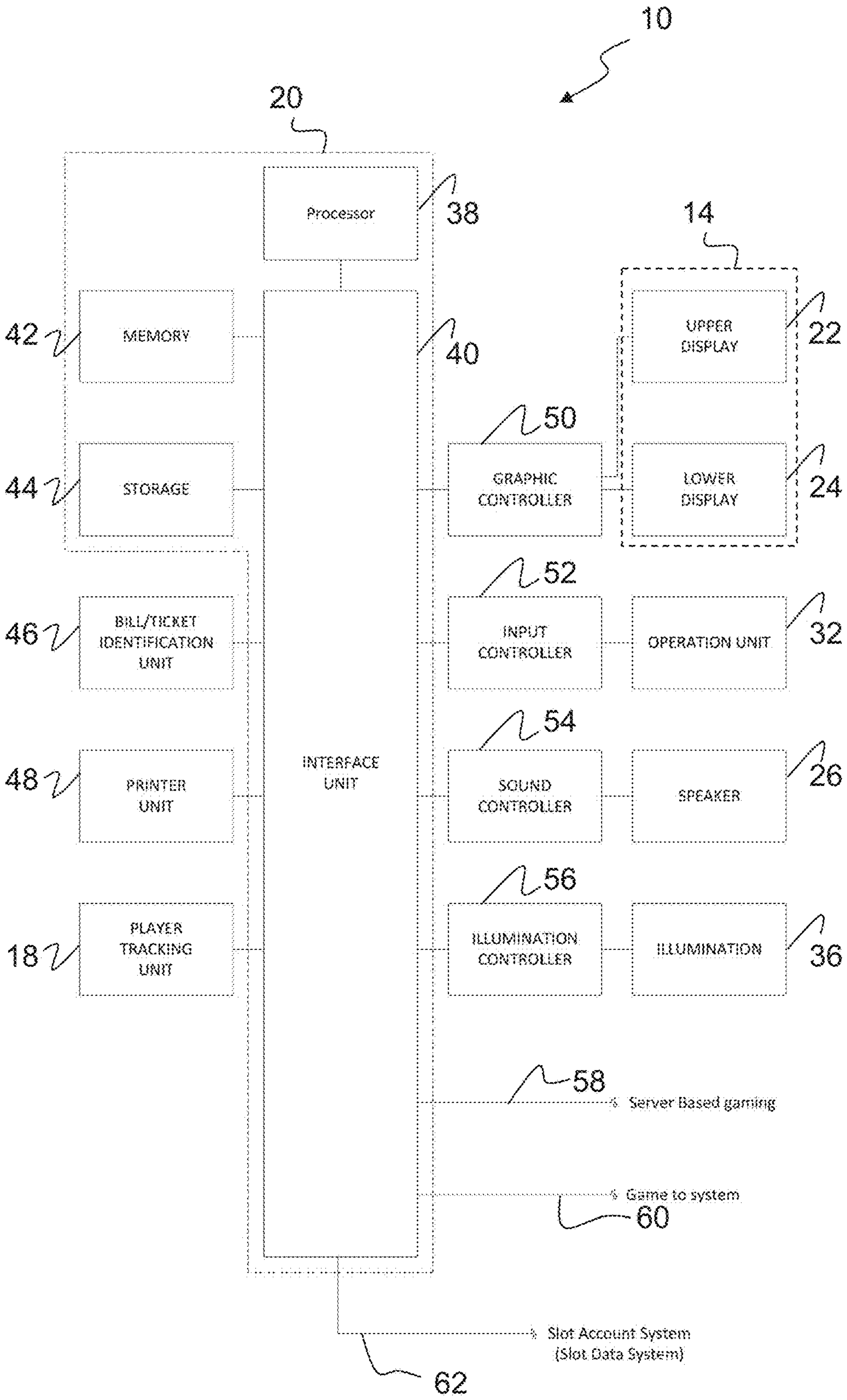
FIG. 2 is a functional block diagram of the gaming machine in FIGS. 1A-1D.

FIG. 2 shows a functional block diagram of the gaming machine 10, according to the present embodiment. The gaming machine 10 provides the control unit 20. Within the cabinet 12, control unit 20 includes a control board equipped with a central processing unit 38 (abbreviated as CPU below) including a processor, an interface unit (or part) 40, a memory device including a memory 42 and a storage 44, and the like are incorporated. The control board is configured so that communication is possible through the interface unit 40 and each of the components equipped on the cabinet 12. The CPU 38 controls the operation of each component by executing the program recorded in the memory 42 or the storage 44 of the CPU 38, and provides a game to the player. The function of the CPU 38 is to execute and display the game on the display unit 14 of the gaming machine 10.

The control unit 20 is configured as the interface unit 40 including a chip set providing communication functions of the CPU 38, a memory bus connected to a CPU 38, various expanding buses, serial interfaces, USB interfaces, Ethernet (registered trademark) interfaces and the like, and a computer unit where the CPU 38 provides the addressable memory 42 and the storage 44 through the interface unit 40. The memory 42 can be configured to include RAM that is a volatile storage medium, ROM that is a nonvolatile storage medium, and EEPROM that is a rewritable nonvolatile storage medium. The storage 44 provides the control unit 20 as an external storage device function, can use reading devices such as a memory card that is a removable storage medium, and a magneto optical disk and the like, and can use hard disks.

On the interface unit 40, in addition to the CPU 38, the memory 42, and the storage 44, a bill/ticket identification unit controller 46, a printer unit controller 48, the player tracking unit 18, a graphic controller 50, an input controller 52, and a sound controller 54 are connected. That is, the control unit 20 is connected to the operation unit 32 through the input controller 52, and connected to the display unit 14 through the graphic controller 50. Further, when illumination devices 36 that provides decorative lighting to the gaming machine 10 is provided, the illumination is controlled under the control of the control unit 20 on the interface unit 40, and an illumination controller 56 that controls the illumination devices 36 to provide a decorative lighting effect may be connected.

The control unit 20, which includes memory 42 and storage 44, controls each part by executing a program stored in the memory 42 and the storage 44, and provides a game to the player. Here, for example, the memory 42 and storage 44 may be configured to store a program and data of an operating system and subsystem that provide the basic functions of the control unit 20 to the EEPROM of the memory 42, and stores a program and data of an application that provides a game to the storage 44. According to such a configuration, it can be easy to change or update a game by replacing the storage 44. Further, the control unit 20 may be a multiprocessor configuration that has a plurality of CPUs.

Each block connected to the control unit 20 is described below. The bill/ticket identification unit controller 46 operates the bill/ticket identification device 28 to receive bills/tickets in the insertion opening, and notifies the control unit 20 of identifying information corresponding to the assortment of bills or the payout processing of credits. The bill/ticket identification unit controller 46 notifies the information to the control unit 20, and the control unit 20 increases the usable credit amount inside of the game according to the notified content. The printer unit controller 48 corresponds to the printer device 30, and under the control of the control unit 20 that receives an operation of the payout button of the group of setting buttons 34, information corresponding to the credit payout processing from the gaming machine 10 is printed and output on a printed ticket.

The player ranking (or tracking unit) unit 18 cooperatively operates with the control unit 20, and sends and receives information and the like of the player from the casino management system. The graphic controller 50 controls the display unit 14, under the control of the control unit 20, and displays a display image that includes various graphic data. The sound controller 54 drives the speakers 26 under the control of the control unit 20, and provides various sounds such as an announcement, sound effects, BGM and the like.

Further, the interface unit 40, has various communication interfaces for communicating with the exterior of the gaming machine 10, for example the interface unit 40 can communicate with an external network by Ethernet 58, 60, and a serial interface 62. In the present embodiment, one example shows when there is communication between a well-known server-side gaming network 58 (Server Based Gaming), a G2S network 60 (Game to System), and a slot information system 62 (Slot Data System), respectively.

Figure 3:
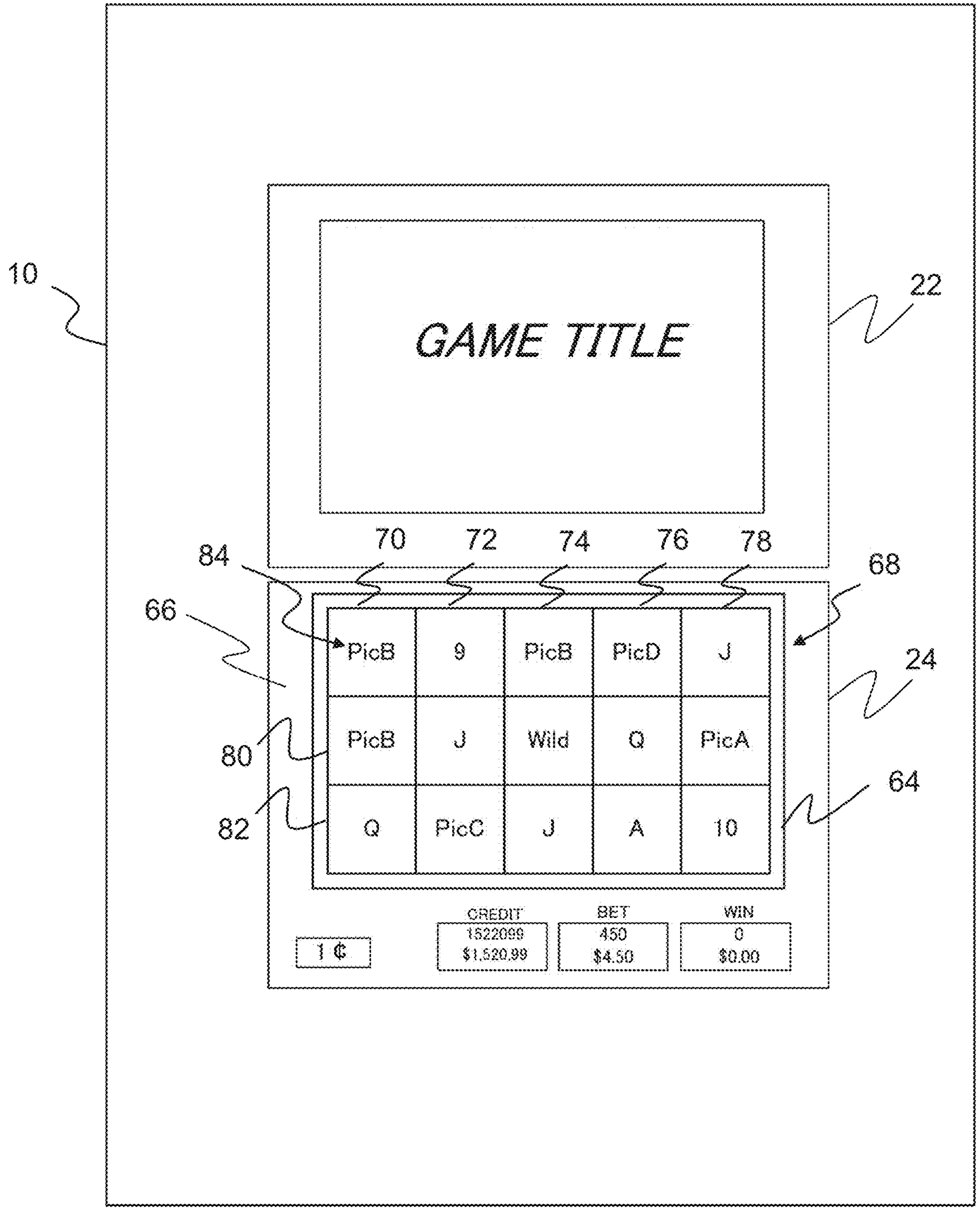
FIG. 3 is an illustration of a game displayed on a display area of the gaming machine, according to an embodiment of the present invention.

FIG. 3 schematically shows a display area 64 provided by the gaming machine 10. Such a display area 64 is displayed on the display unit 14 (the upper display 22 and/or the lower display 24) by the control unit 20 executing a predetermined program. In the illustrated embodiment, the display area 64 is displayed on the lower display 24. For instance, as shown, during a game, the upper display 22 may be utilized to display game related information, e.g., game title information and/or graphics.

In one aspect of the present invention, the control unit 20 executes a game execution program to provide a game 66 that includes a primary game 68 and one or more bonus feature events. The control unit 20 displays a game screen within the display area 64 that includes the primary game 68 and the bonus feature events. In the illustrated embodiment, the primary game 68 and the bonus feature events are displayed on the lower display 24. The upper display 22 may be used to display animations and/or game identifying information during the game and/or during an attract mode. Further, the lower display 24 may display a decorative area, and an area that displays credit amount, bet number, and a credit amount obtained by winning (WIN number) and the like. In another embodiment, the primary game 68 may be displayed in the lower display 24 and the bonus feature events may be displayed in the upper display 22.

Figure 4:
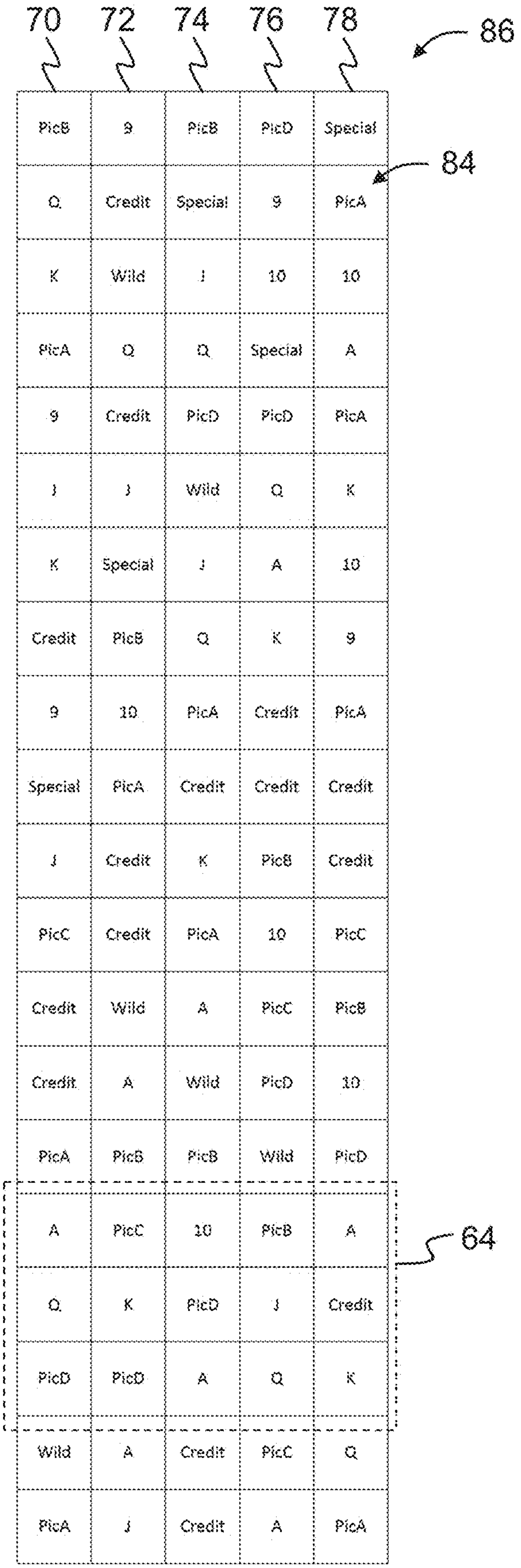
FIG. 4 is an illustration of virtual reels that may be used with the game shown in FIG. 3, according to an embodiment of the present invention.
Figure 5:
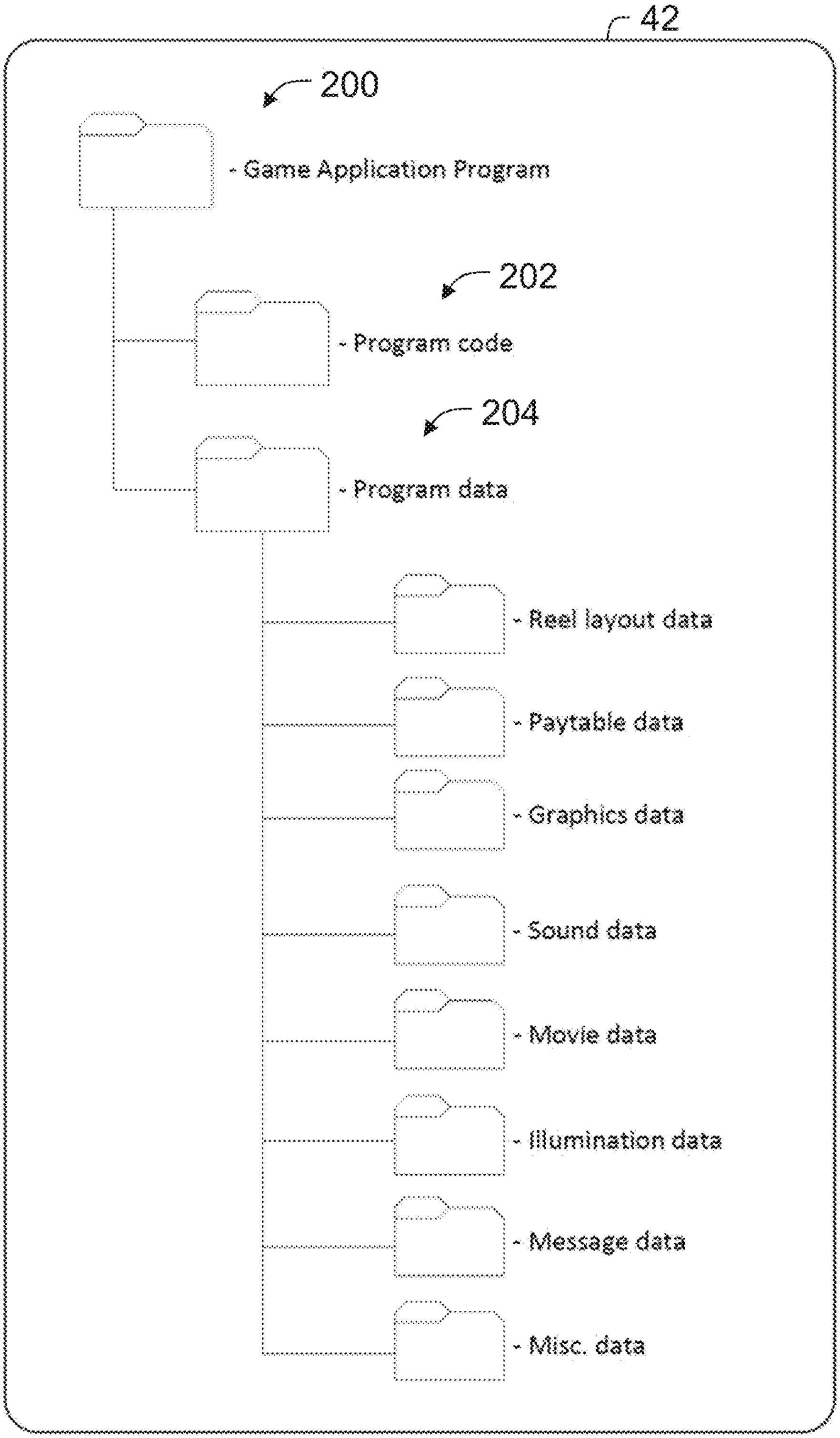
FIGS. 5-8 are block diagrams of a game control unit that may be used with to perform the function of executing a game on the gaming machine.
Figure 6:
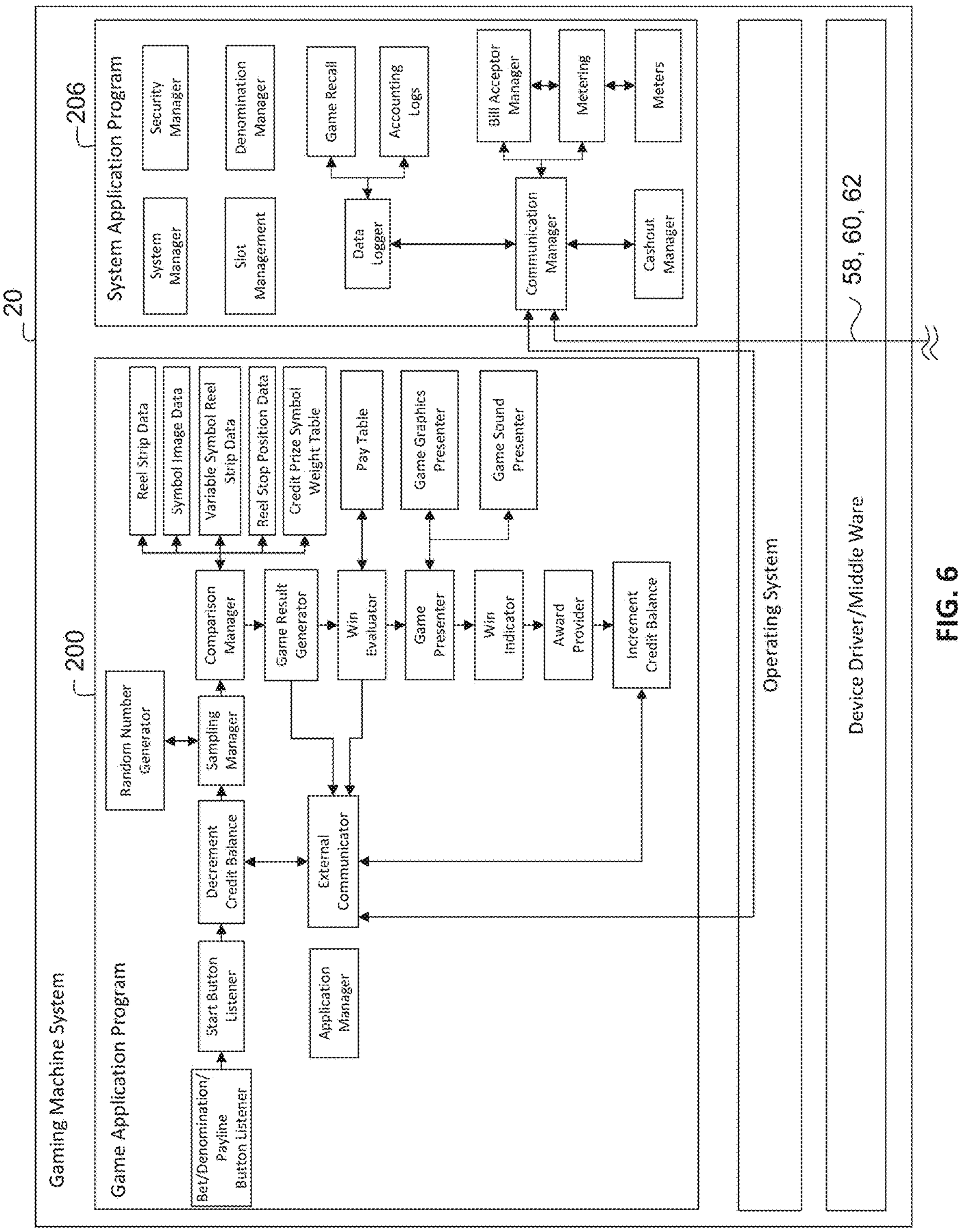
Figure 7:
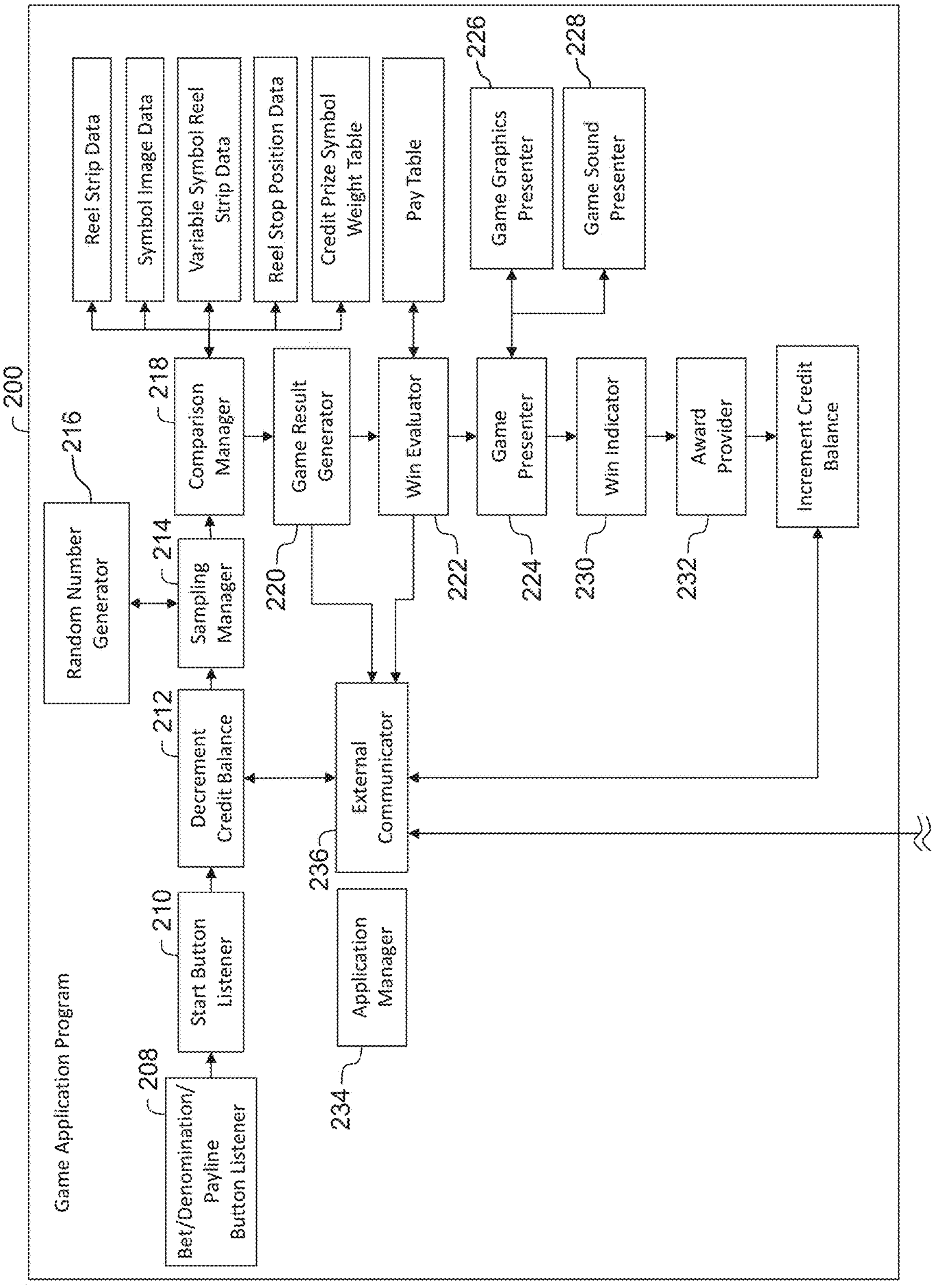
Figure 8:
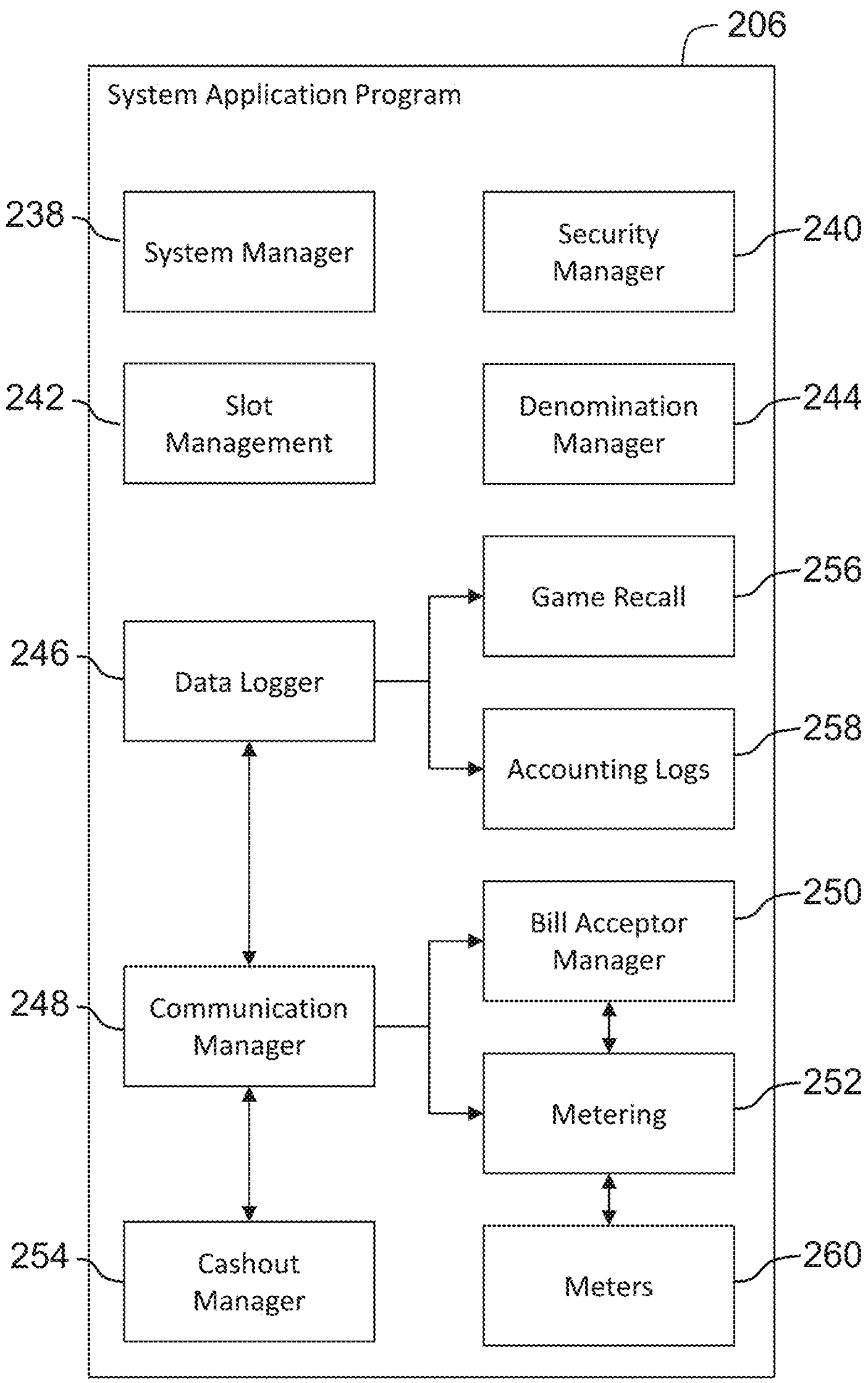

In the illustrated embodiment, the primary game 68 includes a video slot game using a plurality of virtual reels 70, 72, 74, 76, 78 (shown in FIGS. 3-4). The video slot game utilizes a grid 80 in the display area 64. The illustrated embodiment shows the state of displaying the display area 64 in the lower display 24. By using such a display area, the gaming machine 10 of the present embodiment operates as a slot machine that pays a payout according to a winning combination of symbols displayed on the display area 64.

The display unit 14 displays a plurality of game symbols in the grid 80. The grid 80 has a plurality of rows (r) and columns (c). The grid 80 is configured by a plurality of cells 82 that are the stop position of symbols. On each of the plurality of cells 82 of the display area 64, one symbol is stopped and displayed.

In the illustrated embodiment, the grid 80 is displayed with fifteen cells 82 arranged in three rows and five columns, and the control unit 20 generates five virtual reels 70, 72, 74, 76, 78 for use in displaying the primary game 68. On each cell 82 of the grid 80, as shown in FIG. 3, a game symbol 84 is displayed based on the symbol arrangement of virtual reels including virtual reels 70, 72, 74, 76, 78 (also shown in FIG. 4) configured as a virtual reel set 86. That is, the cells 82 of the grid 80 correspond to the virtual reels 70 to 78, by column, and the game symbols 84 disposed on predetermined parts of each virtual reels 70 to 78 are displayed. In the illustrated embodiment, each of the virtual reels 70 to 78 displays multiple symbols within a corresponding column with the virtual reel in a stopped position. For example, as shown in FIG. 3, when stopped, each virtual reel 70 to 78 displays game symbols within each corresponding column. Furthermore, by moving (scrolling or spinning) each game symbol 84 by column based on the symbol arrangement of the virtual reels 70 to 78, the game symbols 84 displayed in the cells 82 of the grid 80 change, and by stopping the movement (scrolling or spinning) by columns, the game symbols 84 are stopped. Here, the virtual reels 70 to 78 are data where the control unit 20 uses a program having the memory 42 or the storage 44, and data showing the symbol arrangement (i.e., the order of symbols on each reel strip) regulated by each cell column. Further, the virtual reel set 86 is a general term for such virtual reels 70 to 78.

In some embodiments, the control unit 20 generates each virtual reel 70 to 78 using reel strip data files 88 (shown in FIG. 11) and symbol image data files stored in memory 42 and/or storage 44. The reel strip data file 88 includes a reel designation 90 associated with each virtual reel 70 to 78 and sequential symbol position logic cells 92 associated with each reel designation 90. Each symbol position logic cell 92 includes indicators for rendering the virtual reels with a plurality of game symbols. The reel strip data file 88 includes information associated with a plurality of reel strips 94, 96, 98, 100, 102 that correspond to each virtual reel 70 to 78, and are used to generate virtual reel 70 to 78. Each reel strip 94, 96, 98, 100, 102 includes a number of symbol positions 104 configured to be populated by game symbols 84 that are selected from symbol image data files stored in memory 42 and/or storage 44. The reel strips 94-102 also include reel stop positions 106 associated with each symbol position 104. The symbol positions 104 and the corresponding game symbols 84 are arranged in an order defined by each reel strip 94, 96, 98, 100, 102. In addition, one or more reel strips 94, 96, 98, 100, 102 includes a different number of symbol positions 104.

In some embodiments, each reel strip 94, 96, 98, 100, 102, includes a plurality of fixed symbol positions 104 for displaying game symbols 84. Each fixed symbol position 104 includes instructions for displaying a predefined game symbol 84 selected from a set of game symbols 84 included in a game symbol image data file. For example, for each play of the game, the fixed symbol positions 104 have an associated predefined game symbol 84 from a symbol set. The game symbol image data file includes the details of game symbols 84 populating the fixed symbol positions 104 and includes varieties of game symbols 84. This symbol set includes card symbols ("9", "10", "J", "Q", "K", and "A") that imitate playing cards as regular symbols, and picture symbols ("PicA", "PicB", "PicC", and "PicD") that show a pattern. Further, this symbol set includes a wild symbol ("Wild") that is substituted as another symbol when a win combination is determined and a special symbol ("Special") that may be used to determine if a game feature is to be provided. Each of these symbols have a different rank from each other regarding their value when winning, their rank gradually raises in this order: "9", "10", "J", "Q", "K", "A", "PicE", "PicD", "PicC", "PicB", "PicA". A combination of symbols that includes high-ranking symbols when winning, can obtain a larger winning payout compared to a combination of low-ranking symbols when winning.

One or more of the reel strips 94, 96, 98, 100, 102 may also include a plurality of variable symbol positions 104 that display a varying inner symbol ("inner"). The variable symbol positions 104 are populated using a variable symbol reel strip data file and/or a variable symbol weight table. The variable symbol reel strip data file includes a variable symbol reel strip that includes a number of symbol positions populated by game symbols that are selected from game symbol image files, and stop positions associated with each symbol position. When generating the virtual reels 70 to 78, the control unit 20 is programmed to populate the variable symbol positions 104 by randomly selecting game symbols from the predefined group of symbols using the variable symbol reel strip. For example, the control unit 20 may be programmed to randomly select a stop position of the variable symbol reel strip, select the symbol position associated with the randomly selected stop position, and populate the variable symbol position 104 with the game symbol 84 associated with the selected symbol position.

It should be noted that in one aspect of the present invention, one or more dynamic virtual reel strips may be utilized. Using virtual reel strips, the symbols and/or symbol positions and/or virtual reel strips and/or length or size and/or any aspect of a virtual reel strip may change from one spin or play to the next. For example, a dynamic reel strip includes a plurality of symbol positions with symbols from the symbol set and a plurality of variable symbol positions. The variable symbol positions may be in the form of one or more stacks, i.e., adjacent symbol positions. In one embodiment, the location and/or size of the stacks may change from one spin to the next, either randomly and/or in a predetermined pattern.

Alternatively, a virtual reel strip associated with a column of cells may be dynamically changed from one spin or play to another spin or play. This, may occur randomly, every spin or play and/or in a predetermined pattern. It should be noted that in the illustrated embodiment, each column of the grid 80 has a corresponding reel. When the reel stops, a symbol from the respective reel appears in each one of the cells of the respective column of the grid 80.

In general, the control unit 20 starts an instance of the primary game 68 and determines the stop position of each virtual reels 70 to 78 randomly using a reel stop position data file 108 (shown in FIG. 12) stored in the memory device. The virtual reels 70 to 78 that are displayed in the display unit 14 (for example, the lower display 24) are moved from a current position, and stopped based on a stop position to express an outcome of the primary game. Due to this, in the display or grid 80, the symbols included on the virtual reels 70 to 78 are continuously moved (scrolled or spun) in a vertical direction of the display area 64, and one symbol of one cell 82 is aligned in an order of the symbol based on the symbol arrangement is stopped so that it is displayed.

Figure 13:
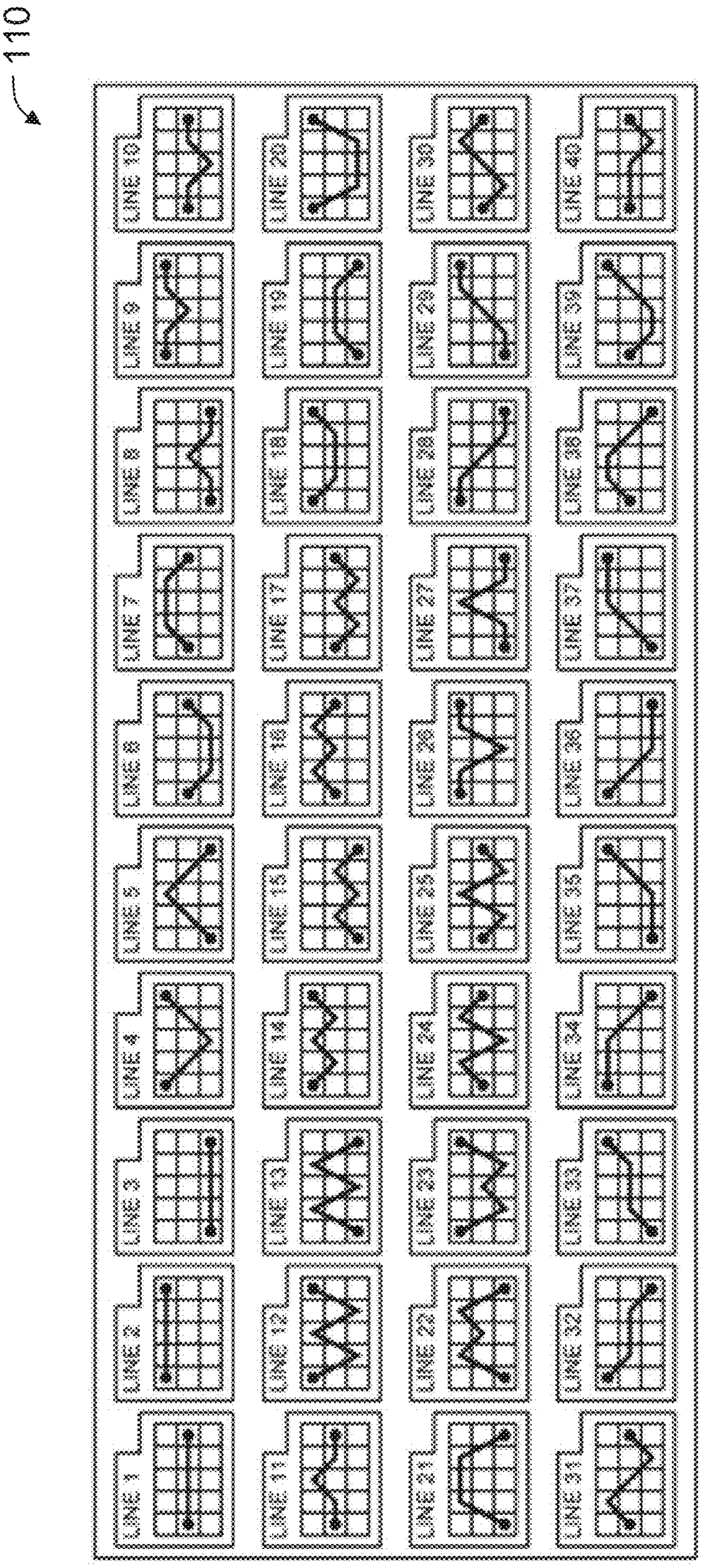
FIG. 13 is an illustration showing one example of a pay line set on the determination area of the game.

The control unit 20 changes and stops the plurality of symbols displayed on the display unit 14 according to the operation of the player received by the operation unit 32, and a payout may be paid according to the stopped symbols inside the display area 64 and a pay line set and paytable data file 110 (show in FIG. 13) stored in the memory device.

In the display area 64, a pay line is set that is used when winning is determined. The pay line is set to be extended over the column on the right end from the cells of the column of the left end, and is a line that combines the plurality of cells 82 determining a win. The number of effective lines within the set pay line is selected by the operation of a group of line designation buttons included in the group of setting buttons 34 of the operation unit 32 for the player. The control unit 20, in regard to the result of a game that is a combination of symbols, determines a win when a predetermined number of identical symbols is surpassed and aligned on a set pay line, and pays a payout to the player according to the type and number of symbols. The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line. It should be noted that pay lines shown other than (or in addition to) the pay lines shown in FIG. 13 may be used. In general, the pay lines start in the first column and end in the last column, and include one cell per column. However, one or more pay lines could include one or more cells in the same column and may include a vertical pay line.

In some embodiments, upon detecting the occurrence of the trigger condition occurring with the primary game, the control unit 20 executes a bonus feature event algorithm to display a bonus feature event. For example, upon detecting the occurrence of the trigger condition, the control unit 20 may display additional game symbols and/or game animations on the game screen and/or transitions the game screen from the primary game to the bonus feature event.

Referring to FIGS. 5-8, in the illustrated embodiment, the memory 42 stores a game application program 200 that includes computer executable instructions that, when executed by the processor 38, cause the processor 38 to generate and display the game on the display unit 14 of the gaming machine 10. In one embodiment, the game application program 200 includes program code 202 and program object data 204 that includes computer executable instructions for implementing a game using the algorithms shown in FIG. 14.

In the illustrated embodiment, the memory 42 stores the game application program 200 and a system application program 206 that includes computer executable instructions that, when executed by the processor 38, cause the processor 38 to generate and display the game on the display unit 14 of the gaming machine 10. The game application program 200 provides game specific/front-end functions and the system application program 206 program provides generic/back-end functions, when executed by the processor 38. In the illustrated embodiment, the game application program 200 and the system application program 206 are implemented on the same operating system. However, it should be noted that these programs may be implemented on different operating system and/or by different processors. In one embodiment, the game application program 200 includes a plurality of software modules including a bet/denomination/payline button listener module 208, a start button listener module 210, a credit balance manager module 212, a sampling manager 214, a random number generator 216, a comparison manager 218, a game result generator 220, a win evaluator 222, a game presenter 224, a game graphics presenter 226, a game sound presenter 228, a win indicator 230, an award provider 232, an application manager 234, and an external communicator 236. The game application program 200 may also include the reel strip data files, the symbol image data files, the variable symbol reel strip data files, the reel stop position data file, the credit prize symbol weight tables, the pay line set, and the paytable data file.

The bet/denomination/payline button listener module 208 is a software module for receiving a signal from the bet button, the denomination button, or the payline button which is generated by the button when a player operates the button to select number of bet, denomination, or number of paylines. In response to receiving the signal, the bet/denomination/payline button listener module 208 communicates the occurrence of the signal to application manager 234 for changing bet, denomination, or payline configuration of the game.

The start button listener module 210 is a software module for receiving a signal from the start button which is generated by the button when a player operates the button to start a game. In response to receiving the signal, the start button listener module 210 communicates the occurrence of the signal to application manager 234 for starting the game.

In response to receiving the signal from start button listener module 210, the application manager 234 requests the sampling manager 214 to obtain necessary number of random numbers from the random number generator 216.

The random number generator 216 generates random numbers based on predetermined algorithm of computational random generation method. The random number generator 216 may be a pseudorandom generator. In response to a request from sampling manager 214, the random number generator 216 returns random number. In some implementations, the random number generator 216 may be implemented in a central server. The random number generator 216 may be implemented as an integrated circuit or hard wired logic.

The comparison manager 218 compares the current state of the game or each random number with the reel strip data files, the symbol selection data files, the reel stop position data file, the pay line set, and/or the paytable data file and specifies corresponding reel layout, stop position, prize symbol, or trigger symbol based on each random number.

The game result generator 220 generates game result based on selected reel layout, stop positions of each reel, and bonus features.

The win evaluator 222 evaluates the game result with reference to the pay table.

The game presenter 224 provides game presentation process with visual and sound so as to form the predetermined game result finally.

The game graphics presenter 226 provides visual game presentation process on the display so as to form the predetermined game result finally.

The game sound presenter 228 provides sound presentation process by using sound controller and speakers.

The win indicator 230 indicates win combinations and payment condition of prize symbol formed in the game result.

The award provider 232 provides award credit to win meter based on the win evaluation.

The application manager 234 administrates activity and status of each software module. In addition, the application manager 234 administrates configuration, progress and states of the game application program 200.

The external communicator 236 communicates instruction and data with the system application program 206.

The credit balance manager module 212 executes a process for decrementing credit balance and incrementing credit balance based on win amount displayed in win meter.

In the illustrated embodiment, the system application program 206 provides back ground processing and functions other than game specific functions. The system application program 206 includes a plurality of software modules including a system manager 238, a security manager 240, a slot management module 242, a denomination manager 244, a data logger 246, a communications manager 248, a bill acceptor manager 250, a metering module 252, and a cashout manager 254.

The system application program 206 may also include a game recall file 256, accounting logs 258, and meters 260.

The system manager 238 is a software module for administrating all of the back ground processing and functions other than game specific functions conducted by the system application program 206.

The security manager 240 is a software module for administrating game verification, door security and monitoring security sensors.

The slot management module 242 is a software module for administrating data accumulation and communicating with external slot information system 62.

The denomination manager 244 is a software module for establishing denomination setting of the gaming machine 10. The denomination setting may include 1 cent, 2 cent, 5 cent, 25 cent, 1 dollar, 5 dollar and the like.

The data logger 246 is a software module for logging result of each primary game and the free game bonus to the game recall. In addition, the data logger 246 stores error events, bill log, cashout log, ticket log etc. to the accounting log.

The game recall file 256 is an accumulated data including results of each primary game and free game bonus. The game recall file 256 is stored in a non-volatile memory.

The accounting logs 258 is an accumulated data including error events, bill log, cashout log, ticket log etc. The accounting logs 258 are stored in a non-volatile memory.

The communications manager 248 is a software module for administrating communication between game application program 200 and system application program 206. The communications manager 248 also administrates network communication between system application program 206 and external network such as slot management system network, G2S network, gaming server for server based gaming network or VLT system network.

The bill acceptor manager 250 is a software module for administrating the bill acceptor and receives bill information inserted in the bill acceptor. In response to receiving the information from the bill acceptor, the bill acceptor manager 250 communicates with the metering for incrementing credit balance based on the inserted bill.

The metering module 252 is a software module for adjusting values of the meters 260 in response to communication with the game application program 200 via communications manager 248, the bill acceptor manager 250 or the cashout manager 254. The meters 260 includes a credit meter for indicating current credit balance on the gaming machine and a win meter for indicating win amount of current game session. The meters further include back ground meters such as coin-in, coin-out, total drop, attendant paid jackpots and/or bill-in. These meters might be implemented as data on the non-volatile memory or hardware meters.

The cashout manager 254 is a software module for administrating cashout procedure. In response to a player's operation on the cashout button, the cashout manager 254 is activated and the gaming machine pay total amount of the credit meter.

Figure 9:
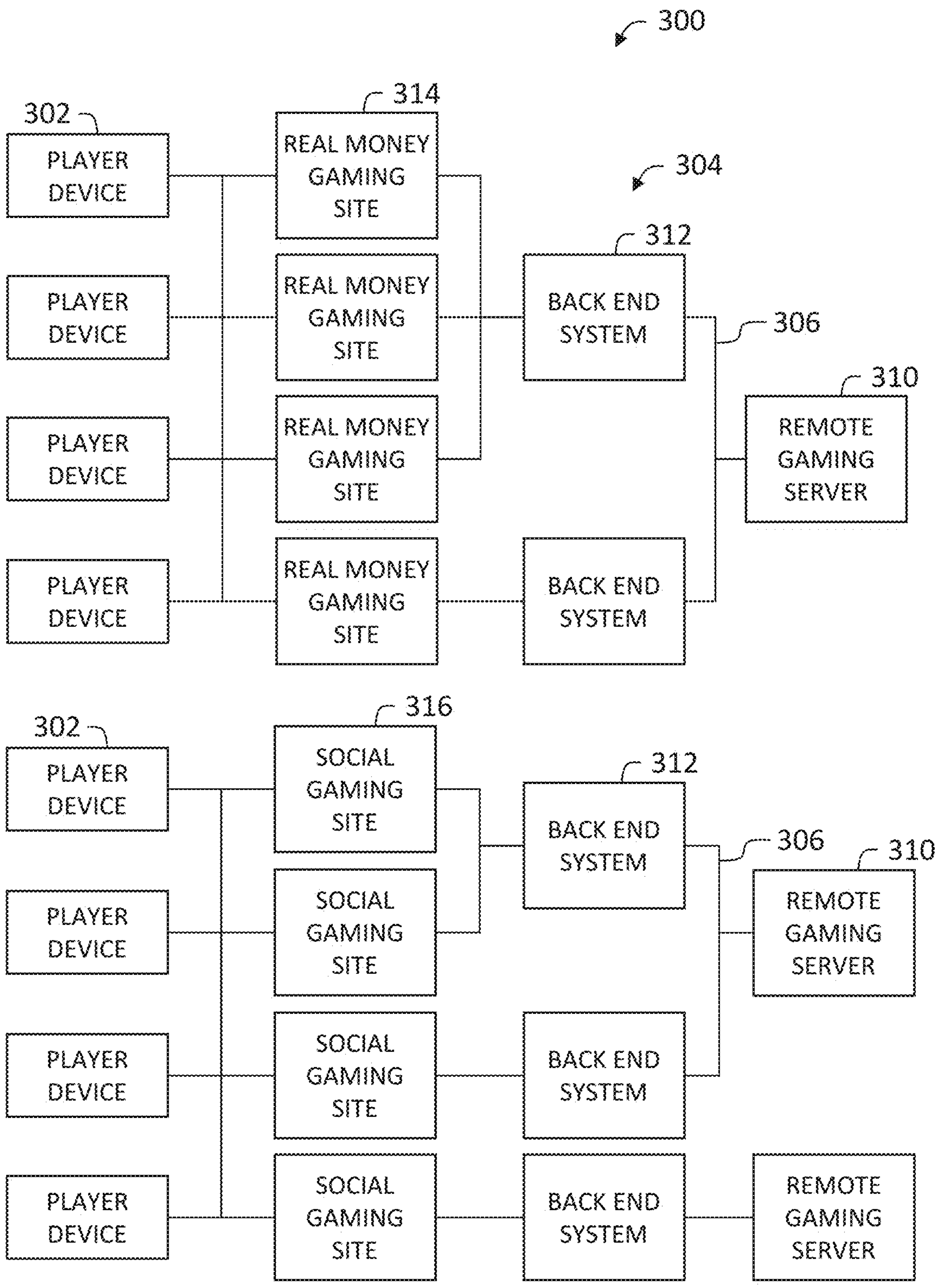
FIG. 9 is a functional block diagram of a server computer system, according to an embodiment of the present invention.
Figure 10:
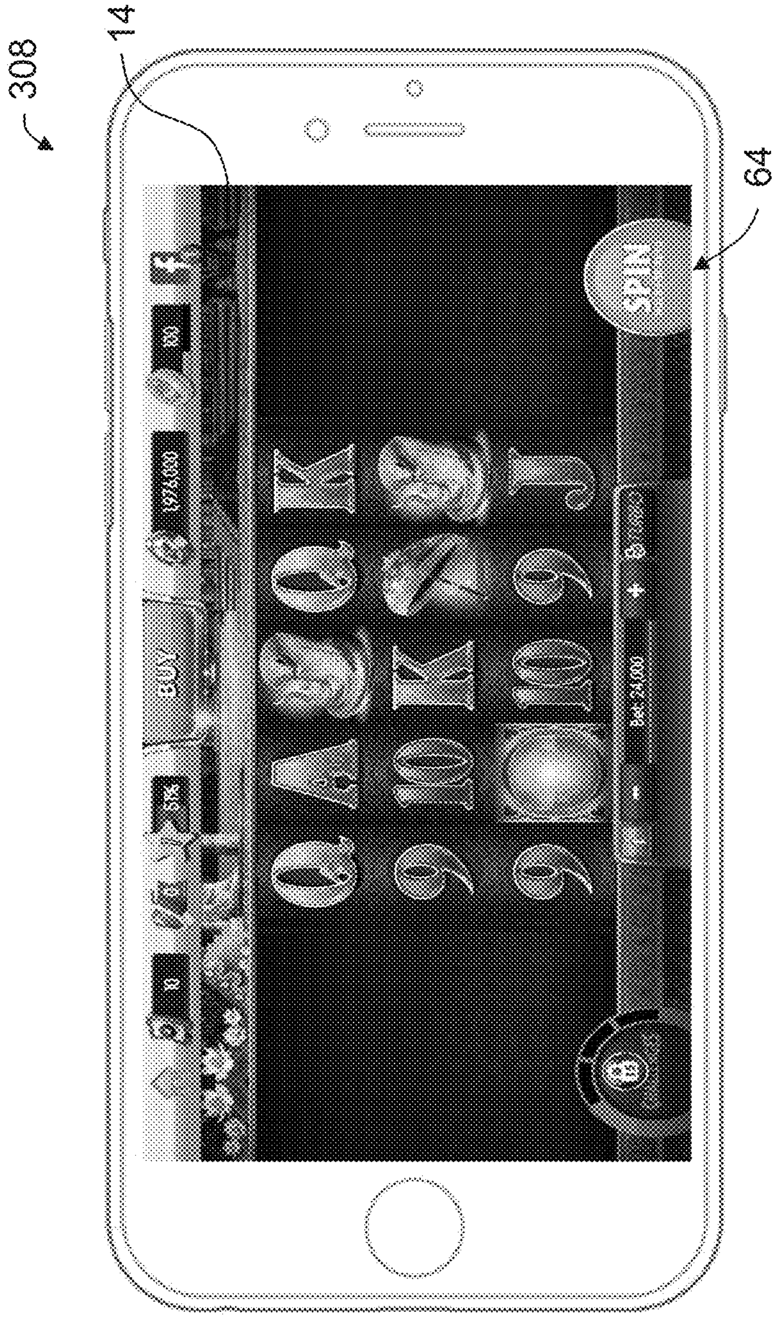
FIG. 10 is a front view of a mobile computing device that may be used with the server computer system of FIG. 9.

Referring to FIGS. 9 and 10, in one embodiment, the present invention includes a networked server computer system 300 that is configured to deliver the game to one or more client computing devices 302 over the Internet. In the illustrated embodiment, the networked computer system 300 includes an iGaming server system 304 that is coupled in communication with one or more client computing devices 302 via a communications network 306. The communications network 306 may be any suitable connection, including the Internet, an Intranet, LAN, a virtual private network (VPN), cellular networks, etc. . . . , and may utilize any suitable or combination of technologies including, but not limited to wired and wireless connections, always on connections, connections made periodically, and connections made as needed.

The client computing device 302 may include any suitable device that enables a user to access and communicate with the server system 300 including sending and/or receiving information to and from the server system 300 and displaying information received from the server system 300 to a user. In the illustrated embodiment, the client computing device 302 includes a processor coupled to a memory device. The memory device stores various programs and data that are executed by the processor for operating the client computing device 302. The client computing device 302 also includes an input device configured to receive operational inputs from the user, and a display device configured to display a graphical user interface. The input device and display device enable a user to interact with the server system 300 via the client computing device 302. For example, in one embodiment, the client computing device 302 may include, but is not limited to, a desktop computer, a laptop or notebook computer, a tablet computer, smartphone/tablet computer hybrid, a personal data assistant, a handheld mobile device including a cellular telephone, and the like. In one embodiment, the processor of the client computing device 302 may be programmed to function as the control unit 22 of the gaming machine 10.

In the illustrated embodiment, the client computing device may include a web browser program stored in the memory device. The processor executes the web browser program to display web pages on the display device that includes information received from the server system 300 to enable a user to interact with and operate the server system 300.

In one embodiment, the client computing device 302 includes a mobile computing device 308 (shown in FIG. 10) such as, for example, a tablet computer, a smartphone/tablet computer hybrid, a smartphone such as an iPhone™, and the like. The mobile computing device 308 includes a processor coupled to a memory device for storing various programs and data for use in operating the mobile computing device 308. The mobile computing device 308 may also include a display unit 14 including a touchscreen, one or more video image cameras, one or more speakers, a microphone, at least one input button, and one or more sensors including, but not limited to, a touch ID fingerprint sensor coupled to an input button, a barometer, a three-axis gyro, an accelerometer, proximity sensor, and an ambient light sensor. In addition, the mobile computing device 308 may also include a Wi-Fi antenna, a cellular network antenna, a Bluetooth™ communications device, assisted GPS and GLONASS, a digital compass, and an iBeacon™ microlocation device.

The mobile computing device 308 may be programmed to store and execute mobile computer program applications that display graphical user interfaces on the touchscreen display unit 14 including display area 64 that allows the user to access the server system 300 to retrieve and store information within the server system 300 as well as interact with and operate the server system 300. In addition, in one embodiment, the server system 300 may install one or more mobile computer application programs in the memory device of the mobile computing device 308. When initiated by the processor of the mobile computing device 308, the mobile computer application program causes the processor of the mobile computing device 308 to perform some or all of the functions of the gaming machine 10.

In the illustrated embodiment, the server system 300 includes one or more remote gaming servers 310, one or more back-end servers 312, one or more real money gaming website hosting servers 314, and one or more social gaming website hosting servers 316. In the illustrated embodiment, the social gaming website hosting server 316 and the real money gaming website hosting server 314 are programmed to host a website that is accessible by a user via one or more client computing devices 302. The website hosting servers 314 and 316 execute a website application program that retrieves application code from the back-end server 312 and executes the application code to render one or more webpages on a display device of a client computing device 302 in response to requests received from the user via the client computing device 302 to allow users to interact with the website. The website hosting servers 314 and 316 are configured to generate and display webpages displaying a game. For example, the real money gaming website hosting server 314 is configured to host a real money wagering website that enables players to convert monetary funds to gaming credits that may be used to place wagers on the game. The social gaming website hosting server 316 is configured to host a social media and/or social gaming website that allows players to receive gaming credits for activities such as purchasing goods and/or services through an e-commerce website, and/or purchase gaming credits that may be used to play the game.

Each back-end server 312 is configured to perform operations to support the functions of the webpages and/or website being displayed by the website hosting servers 314 and 316. For example, in one embodiment, the back-end servers 312 may include a player account system server that is configured to generate player accounts that include data associated with a player including, but not limited to, player identification information, player financial account information, player gaming credit account information, and/or any suitable player information, that may be used to establish credit meters and allow players to place wagers on the game.

Each remote gaming server 310 includes one or more copies of the game application program 200 stored in a memory device of the remote gaming server 310. A processor of the remote gaming server 310 is programmed to retrieve and transmit the game application program 200 to one or more back-end servers 312 for use in displaying the game to the user via a webpage being displayed by the web browser program.

In one embodiment, the game application program 200 may include instructions for rendering the game and executing the game on the client computing device 302. For example, the game application program 200 may include instructions for generating rendered code, such as, for example HTML code, which may be used by the web browser program of the client computing device 302 for displaying the game. For example, the game application program 200 may include program software code including, but not limited to, HTML, JavaScript, cascade style sheets (CSS), and any suitable programming code that may be used for rendering and operating the game via a website and/or mobile computer application.

In one embodiment, upon receiving a request from the website hosting servers 314, 316 via the back-end server 312, the remote gaming server 310 may execute the game application program 200 to operate the game, and execute a render-to-string operation to generate rendered code indicative of the game, such as, for example HTML code, and transmit the rendered code to the back-end server 312. The back-end server 312 may then transmit the rendered code to the corresponding website hosting servers 314, 316 for use in displaying the game on the website. As the player plays the game, the remote gaming server 310 may execute the game application program 200 for each instance of the game, and transit rendered code to the back-end servers 312.

In another embodiment, the remote gaming server 310 may transmit the game application program 200 to the back-end server 312 and/or the website hosting servers 314, 316. The back-end server 312 and/or the website hosting servers 314, 316 may then execute the game application program 200 to initiate the instances of the game and execute render-to-string operations to generate rendered code indicative of the game.

In yet another embodiment, the back-end server 312 may receive a request to initiate the game from a mobile computing device 308 executing the mobile computer application program. Upon receiving the request, the back-end server 312 may access the game application program 200 and execute a render-to-string operation to generate rendered code indicative of the game and transmit the rendered code to the mobile computing device 308. In one embodiment, the back-end server 312 may continuously execute the game application program 200 to generated each instance of the game using a random number generator of the back-end server 312 based on input received from the mobile computing device 308 and generate and transmit rendered code for each instance of the game to the mobile computing device 308. In another embodiment, the back-end server 312 may execute a partial-render operation and generate partially-rendered code of the game using the game application program 200, and transmit the partially rendered code of the game and object data of game assets to the mobile computing device 308. The partially rendered code includes instructions for generating rendered code using the game assets and a random number generator of the mobile computing device for generating and displaying the game on the mobile computing device 308 using the mobile computer application program.

In one embodiment, the game application program 200 may be stored on several different servers. The game code on these servers is used to distribute game content to social or real money gaming websites and mobile applications. The distribution method is very flexible. For example, the game code and/or game application program 200 including game code and game object assets may be stored on a remote gaming server 310. One remote gaming server 310 may be connected to one or more back-end server 312.

Each back-end server 312 is configured to distribute the games to one or more websites or mobile applications. Players connect to these websites/mobile applications with the client devices or mobile devices and have access to the game content. A copy of game application program 200 including game code and game object assets is stored on the remote gaming server 310 for each back-end server 312 that is connected to the remote gaming server 310 and that distributes the game. For example, if one remote gaming server 310 is connected to two back-end servers 312, which is connected to three website hosting servers 314, 316 that distribute the game, the remote gaming server 310 would store two copies of the game application program 200 including game code and game object assets for the game (e.g., one copy for each back-end server 312).

For example, the server system 300 may be configured to implement the game on a mobile application such as, for example, "my KONAMI Slots™" mobile application available in Apple iOS™, Google Android™, and Amazon Kindle™ operating platforms, or on social-media websites such as the "my KONAMI Slots™" available on Facebook™. In one embodiment, the mobile application may download the game code from remote gaming server 310 via the real money gaming site 314 or the social gaming site 316 and execute the game code on the client computing device 302. In this embodiment, the game code may provide game specific/front-end function when executed by the processor of the client computing device, and the back end system 312 may provide generic/back-end function.

Figure 14:
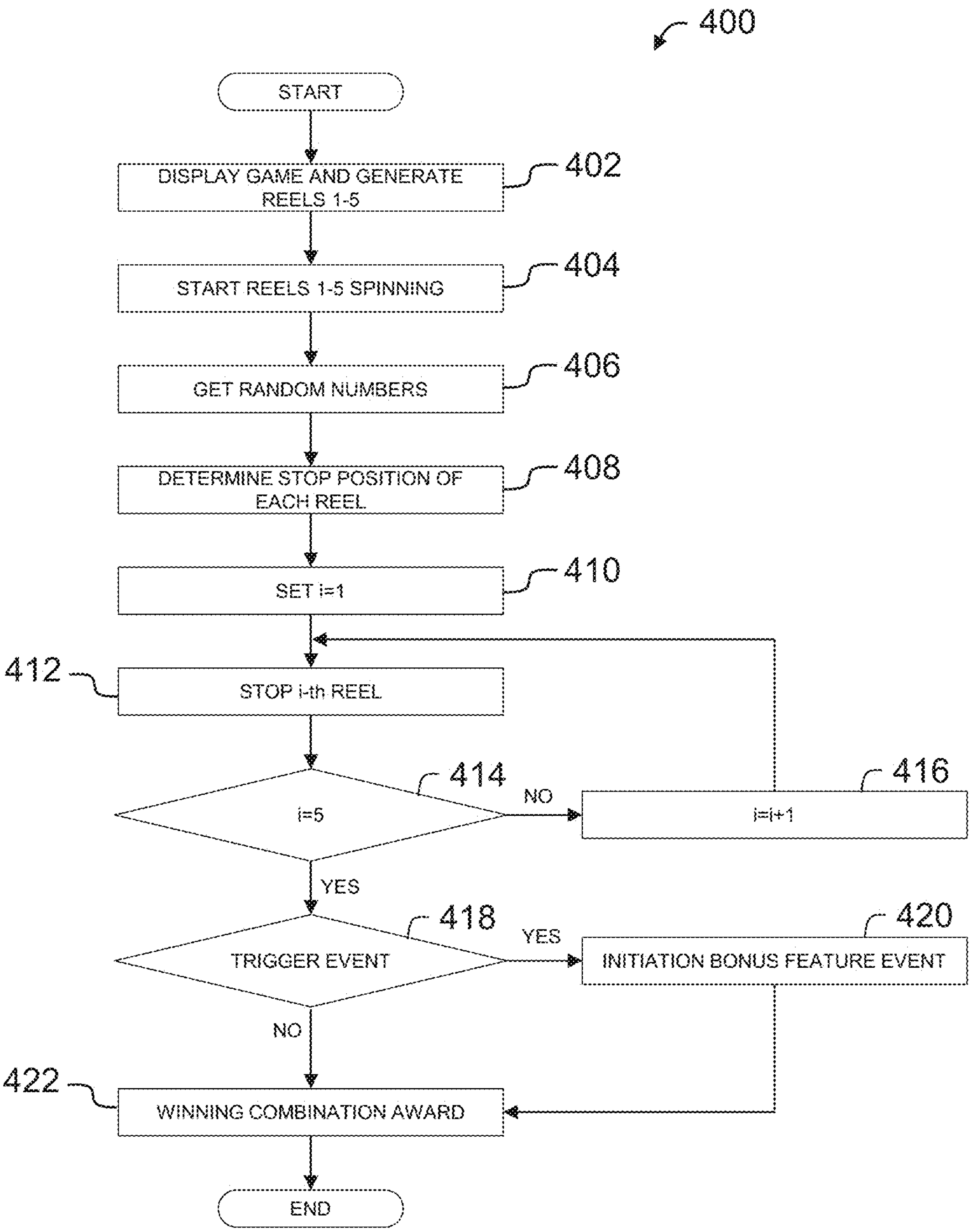
FIG. 14 is a flow chart illustrating an algorithm used during operation of the gaming machine and/or the mobile computing device to execute the game, according to one embodiment of the present invention.

FIG. 14 is a flow chart of method 400 illustrating the algorithms included in the game application program 200 and performed by the processor 38 when executing the game application program 200 for operating the gaming machine 10 and/or iGaming server system 300 to implement the game. The methods include a plurality of steps. Each method step may be performed independently of, or in combination with, other method steps. Portions of the methods may be performed by any one of, or any combination of, the components of the gaming machine 10 and/or iGaming server system 300.

In the illustrated embodiment, the game application program 200 includes computer instructions for generating the primary game 68 and the bonus feature event. In general, the bonus feature event is executed when a triggering event is detected during the primary game 68. In one embodiment, the primary game 68 includes a reel-type game that includes a plurality of virtual reels that spin and stop to display the outcomes of the primary game. In other embodiments, the primary game 68 may include a playing card game, a bingo game, a Keno game, and/or any suitable casino type wagering game.

In the illustrated embodiment, the control unit 20 is programmed to execute the algorithm illustrated in method 400 for executing the game and displaying the game on the display unit 14. In method step 402, the processor 38 of the control unit 20 generates the virtual reels 70-78 for use with an instance of the primary game 68, and displays the virtual reels 70-78 in the grid 80.

In method step 404, the processor 38 receives a signal to initiate an instance of the game 66 and generates the virtual reels 70-78 for use during the instance of the game 66. For example, the processor 38 may receive a signal from the display unit 14 and/or the operation unit 32 indicating a player's request to initiate an instance or play of the game 66. In one embodiment, the player may transmit a request to initiate an instance or play of game 66 by depressing a corresponding "spin" button on the operation unit 32 by touching a corresponding button icon being displayed on a touchscreen of the display unit 14. Upon receiving a signal from the display unit 14 and/or the operation unit 32, the processor 38 initiates the instance of the game 66 by generating the virtual reels 70-78 for use in the primary game 68.

In method steps 406-416, the processor 38 randomly determines an outcome of an instance of the primary game 68 and spins the virtual reels 70 to 78 and sequentially stops the virtual reels 70 to 78 to display the randomly generated outcome including a game symbol being displayed in each cell 82 of the grid 80. For example, in one embodiment, the processor 38 starts spinning each virtual reel 70 to 78, obtains random numbers from the random number generator, and determines a stop position of each virtual reel 70 to 78 based on the random numbers and the reel stop position data file 108. In the illustrated embodiment the reel stop position data file 108 includes a range of random numbers associated with each symbol position in the sequence of symbol positions associated with the virtual reel. In one embodiment, the processor may obtain a random number for each simulate virtual reel 70 to 78, i.e., five random numbers. The processor 38 then establishes a reel stop counter, "i", and sets the reel stop counter, i, equal to 1. The processor 38 then identifies the ith virtual reel strip associated with the stop counter, i, and stops the identified virtual reel strip to display the corresponding symbols in the corresponding cells 82 associated with the identified virtual reel strip. The processor 38 then increments the reel stop counter, i, by 1, i.e., i=i+1, and repeats the process of identifying the virtual reel strip associated with the incremented reel stop counter and stopping the identified virtual reel. This process continues until each virtual reel has been stopped. In this embodiment, for example, the virtual reels are numbered 1-5. In one embodiment, during the reel spin, the player may initiate the stopping of the reels by depressing the spin button, which enables the player to accelerate game play.

In method step 418, the processor 38 determines whether a trigger condition has been detected in the outcome of the primary game 68. If a trigger condition is detected during the primary game 68, the processor 38 initiates the bonus feature event in method step 420.

In method step 422, upon completion of the primary game 68 and/or the bonus feature event, the processor 38 determines and provides any award associated with the outcome of the primary game 68 and/or the bonus feature event. For example, the processor 38 may determine whether any winning combination of symbols is displayed in the outcome of the instance of the primary game 68 and/or the bonus feature event provide an award by increasing a balance of the credit meter based on the amount of the award.

Figure 15:
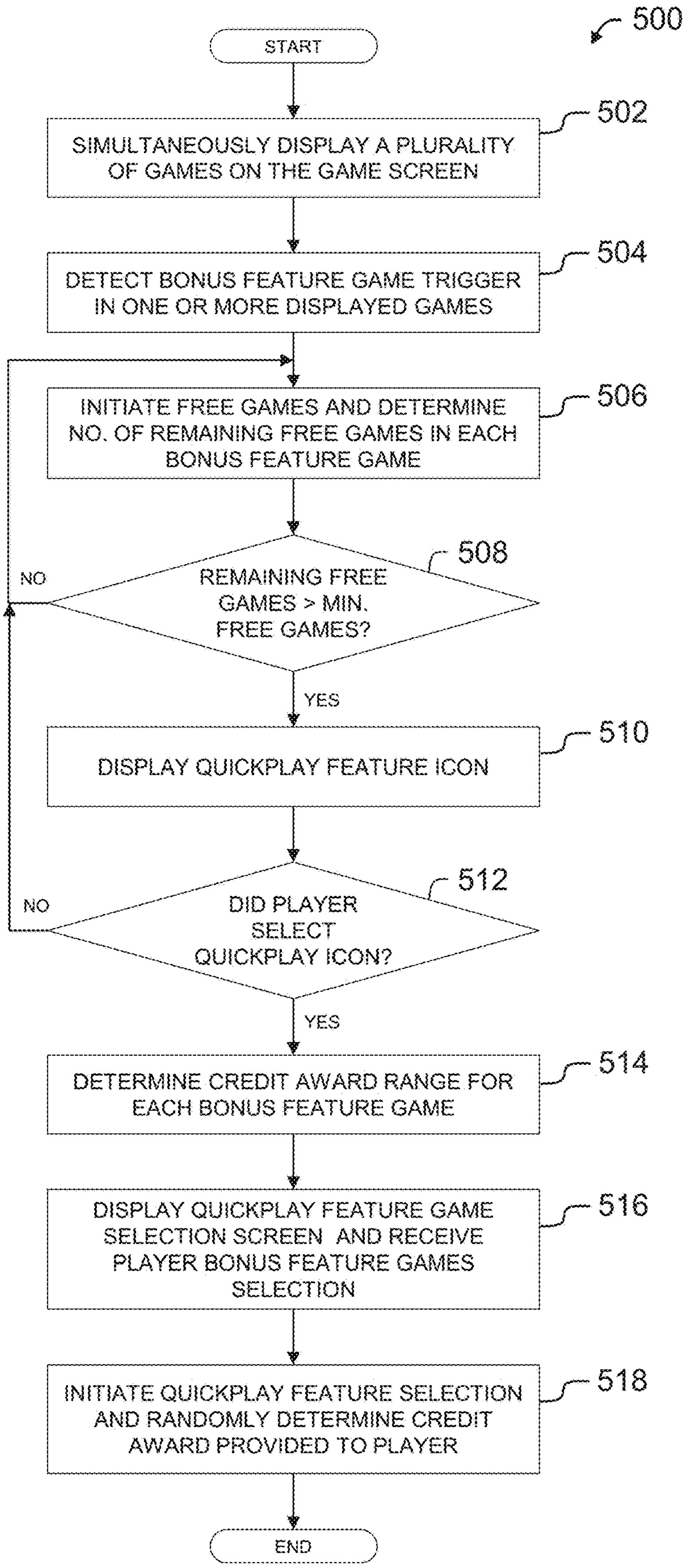
FIG. 15 is a flow chart illustrating an algorithm used during operation of the gaming machine and/or the mobile computing device to execute the game, according to one embodiment of the present invention.
Figure 17:
FIGS. 17-28 are exemplary illustrations of game screens illustrating the algorithm shown in FIG. 15.

FIG. 15 is a flow chart of method 500 illustrating the algorithms included in the game application program 200 and performed by the processor 38 when executing the game application program 200 for operating the gaming machine 10 and/or iGaming server system 300 to implement the game. The methods include a plurality of steps. Each method step may be performed independently of, or in combination with, other method steps. Portions of the methods may be performed by any one of, or any combination of, the components of the gaming machine 10 and/or iGaming server system 300.

Figure 19:
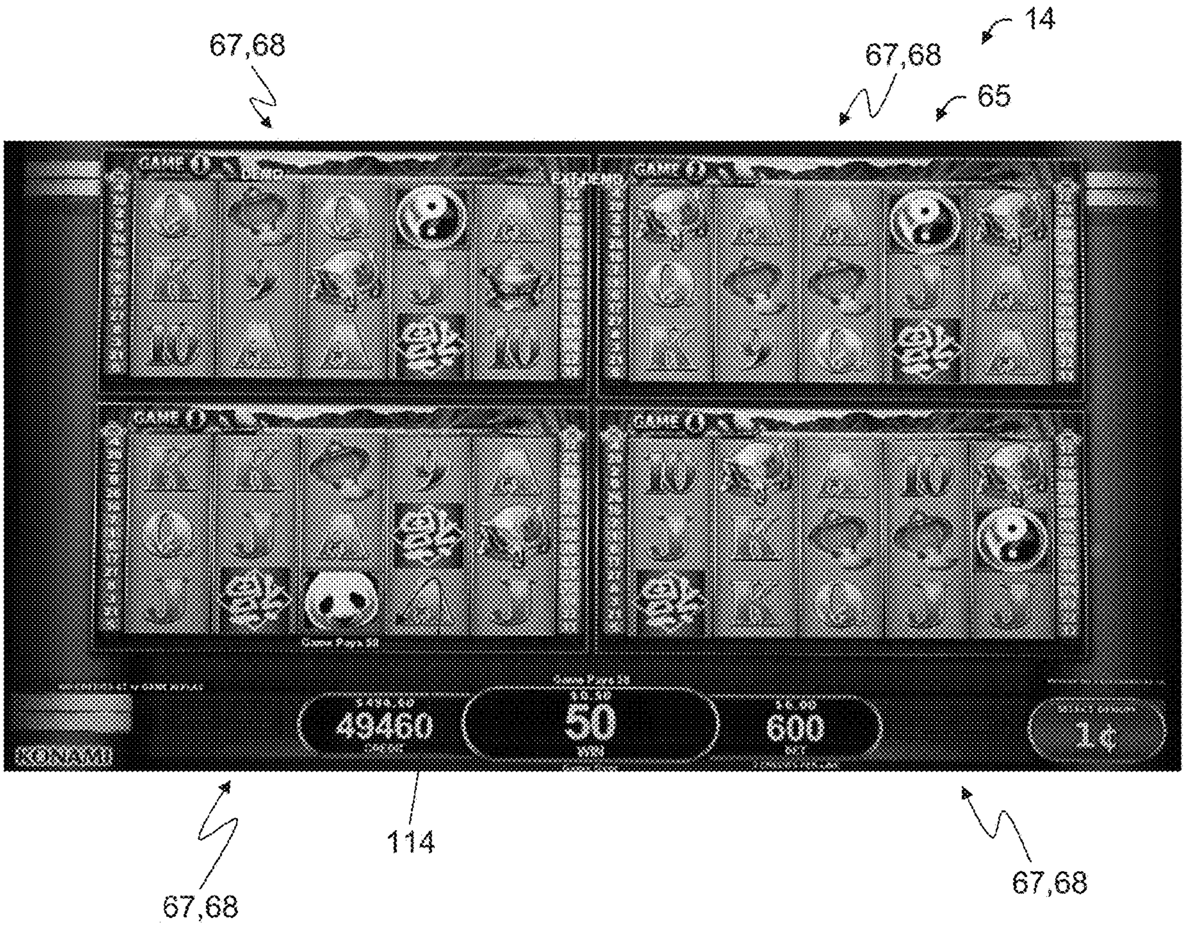

In the illustrated embodiment, as shown in FIG. 19, the game application program 200 includes computer instructions for simultaneously displaying a plurality of games 68 on the game screen. For example, the game application program 200 includes computer instructions for providing the Quad Spin™ slot game offered by Konami Gaming™ Inc. which simultaneously displaying four games (e.g., Game 1, Game 2, Game 3, and Game 4). Each game 68 includes a bonus feature that awards a number of free games (e.g., free spins, free plays, etc.) to the player.

In some embodiments, the plurality of games 68 include reel-type games that includes a plurality of virtual reels that spin and stop to display the outcomes of the primary game. In other embodiments, the primary games 68 may include one or more playing card games, bingo games, Keno games, and/or any suitable casino type wagering game or combination of suitable casino type wagering game.

Figure 24:
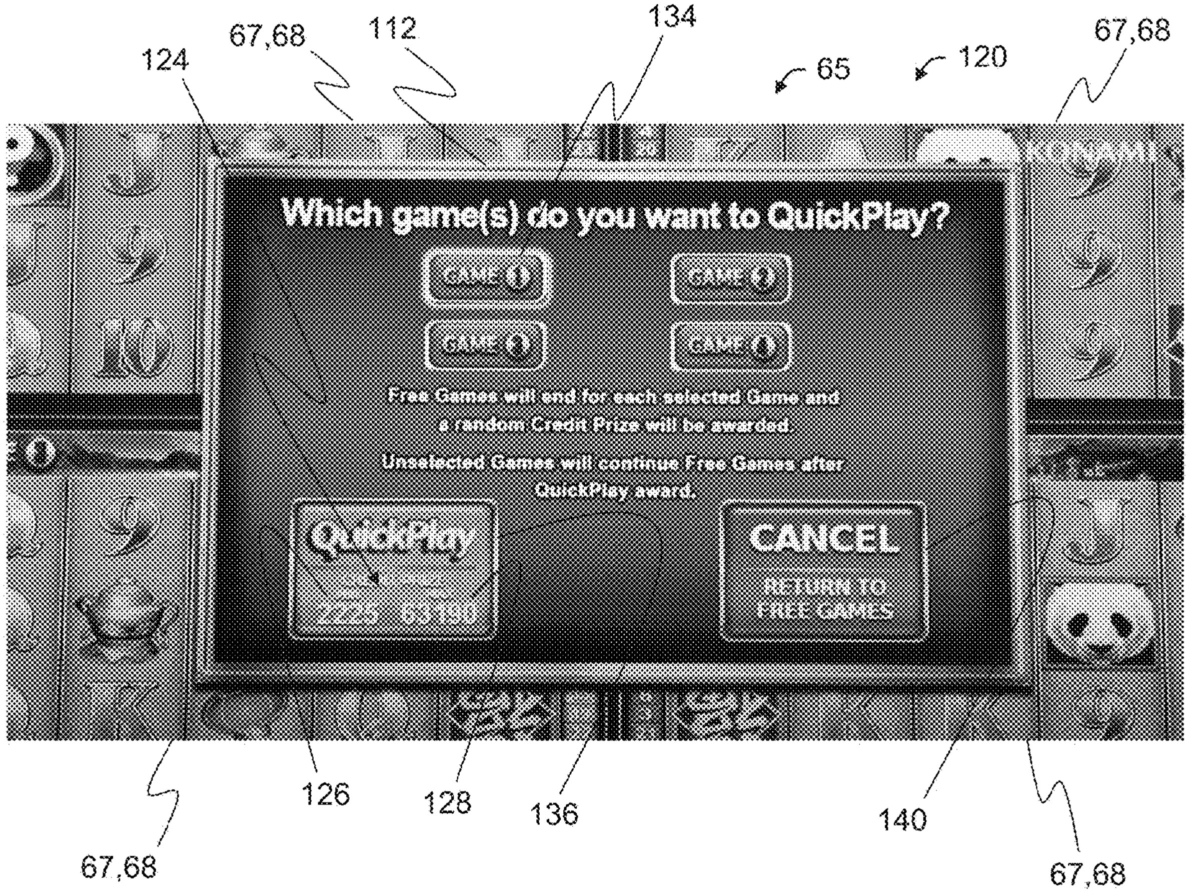

In addition, as shown in FIG. 24, the game application program 200 also includes computer instructions for displaying a QuickPlay™ credit award feature that renders a QuickPlay credit award selection screen 112 on the display unit 14 that allows the player to select a randomly selected credit award in exchange for a remaining number of free games being provided in one or more of the plurality of games 68 (e.g., Game 1, Game 2, Game 3, and Game 4). For example, the game application program 200 may include computer instructions for providing the QuickPlay™ credit award feature that allows the player exchange free games for a randomly selected credit prize.

In the illustrated embodiment, the control unit 20 is programmed to execute the algorithm illustrated in method 500 for executing the games and displaying the games on the display unit 14. In method step 502, the processor 38 of the control unit 20 simultaneously displays a plurality of games 68 on a game screen 65. The processor 38 renders the game screen 65 on the display unit 14 to include a plurality of game areas 67, with each game area 67 displaying images of a corresponding game 68. For example, as shown in FIG. 19, the processor 38 renders the game screen 65 to include four game areas 67 arranged in a 2×2 grid, with each game area 67 displaying a corresponding game 68 (e.g., Game 1, Game 2, Game 3, Game 4). In some embodiments, the processor 38 may render the game screen 65 to include two or more game areas 67 displaying two or more corresponding games 68. For each game 68, the control unit 20 generates the virtual reels 70-78 for use with each game 68 and displays the virtual reels 70-78 in the grid 80 of each game 68. The processor 38 then receives a signal to initiate the games, randomly determines an outcome of an instance of each of the games and spins the virtual reels 70 to 78 and sequentially stops the virtual reels 70 to 78 of each game 68 to display the randomly generated outcome. For example, in some embodiments, the processor executes the algorithm illustrated in method 400 to display an instance of each game 68.

Figure 18:
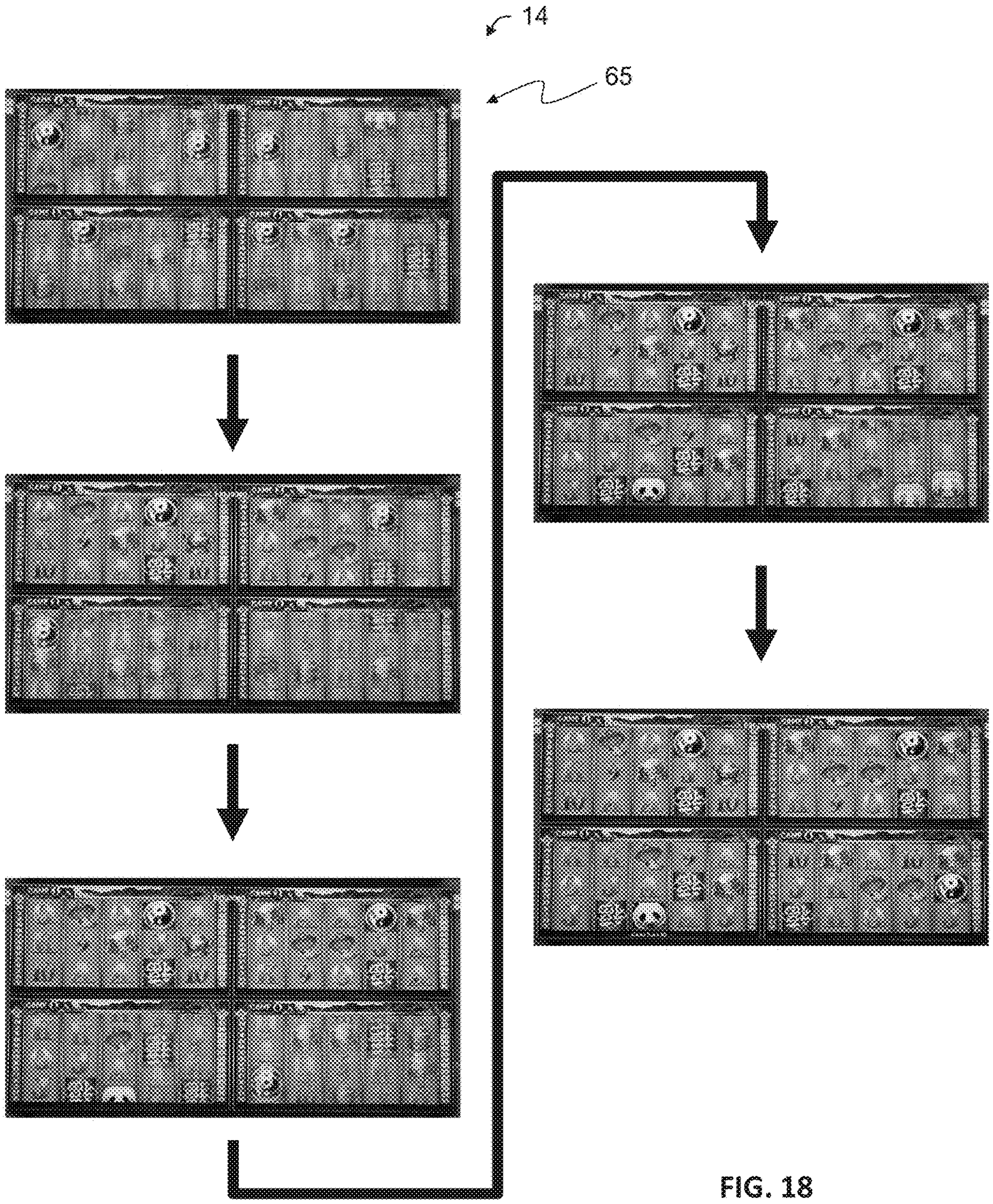

For example, as shown in FIGS. 18 and 19, in one embodiment, upon receiving a signal to initiate the games, the processor 38 randomly selects an outcome of each of the games 68, i.e., Game 1, Game 2, Game 3, Game 4, and spins the reels in each of the games. The processor 38 then stops the reels of each game to display the outcome of Game 1, Game 2, Game 3, and Game 4 in sequential order. For example, when displaying the outcomes of the games, the processor 38 stops the reels of Game 1 first, then stops the reels of Game 2, then stops the reels of Game 3, then stops the reels of Game 4 to sequentially display the outcome of each of the games 68. In addition, in some embodiments, to display the outcome of each game 68 the processor 38 sequentially stops each reel beginning with the left-most reel to the right-most reel.

As shown in FIG. 19, in some embodiments, upon detecting a winning outcome in a game, the processor 38 may display a credit award indicator 114 associated with the winning outcome. For example, after displaying the outcomes of Game 1, Game 2, Game 3, and Game 4 in sequential order, the processor 38 detects a winning outcome in Game 3 and displays the credit award indicator 114 (e.g., "Game Pays 50") associated with Game 3 indicating the credit award associated with the outcome of Game 3.

Figure 20:
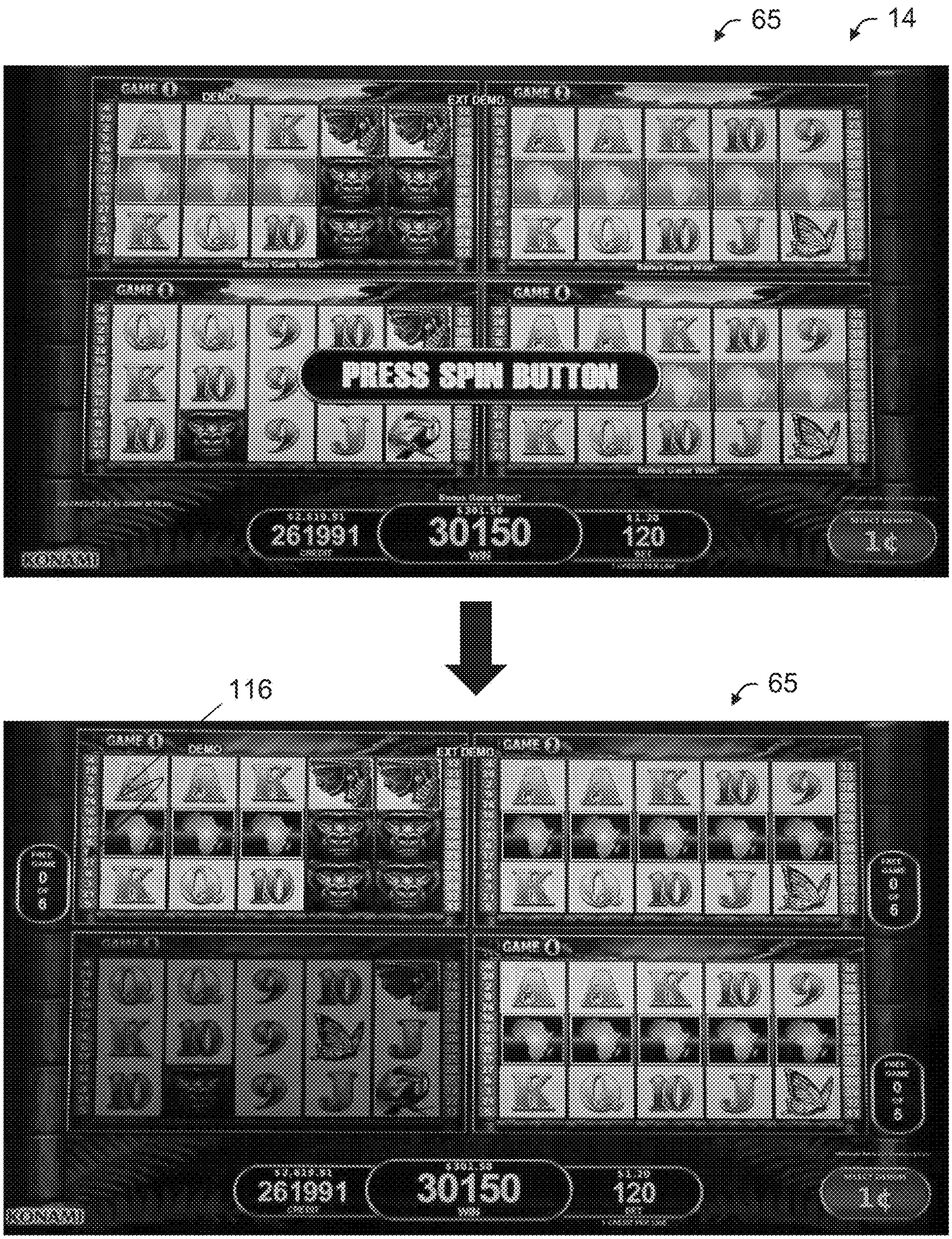
Figure 22:

In method step 504, the processor detects a bonus feature game trigger occurring in the outcomes of one or more of the games 68. For example, in FIG. 20, the processor 38 detects a bonus feature game trigger occurring in the outcomes of Game 1, Game 2, and Game 4. The processor 38 then determines the number of free games awarded to the player based on the bonus feature game trigger detected for each corresponding game. In some embodiments, upon detecting one or more bonus feature games triggers, the processor 38 may display a message (e.g., "Press Spin Button") on the game screen 65 prompting the player to initiate the bonus feature games by pressing a spin button. Upon receiving the player's selection of the spin button, or after a predetermine period of time has elapsed, the processor 38 may dim the display of the game that did not trigger a bonus feature (e.g., dim Game 3) to highlight the games that have triggered bonus feature games (e.g., Game 1, Game 2, and Game 4). In addition, the processor 38 may display a free game icon 116 adjacent to each game having triggered bonus feature games indicating the number of bonus games awarded with the corresponding game and the number of bonus games that have been played. For example, as shown in FIG. 20, the processor 38 displays a free game icon 116 associated with Game 1 indicating that 6 free games have been awarded and 0 free games have been played. Similarly, as shown in FIG. 22, the processor 38 displays a free game icon 116 associated with Game 2 indicating that 25 free games have been awarded and 1 free games has been played.

Figure 21:
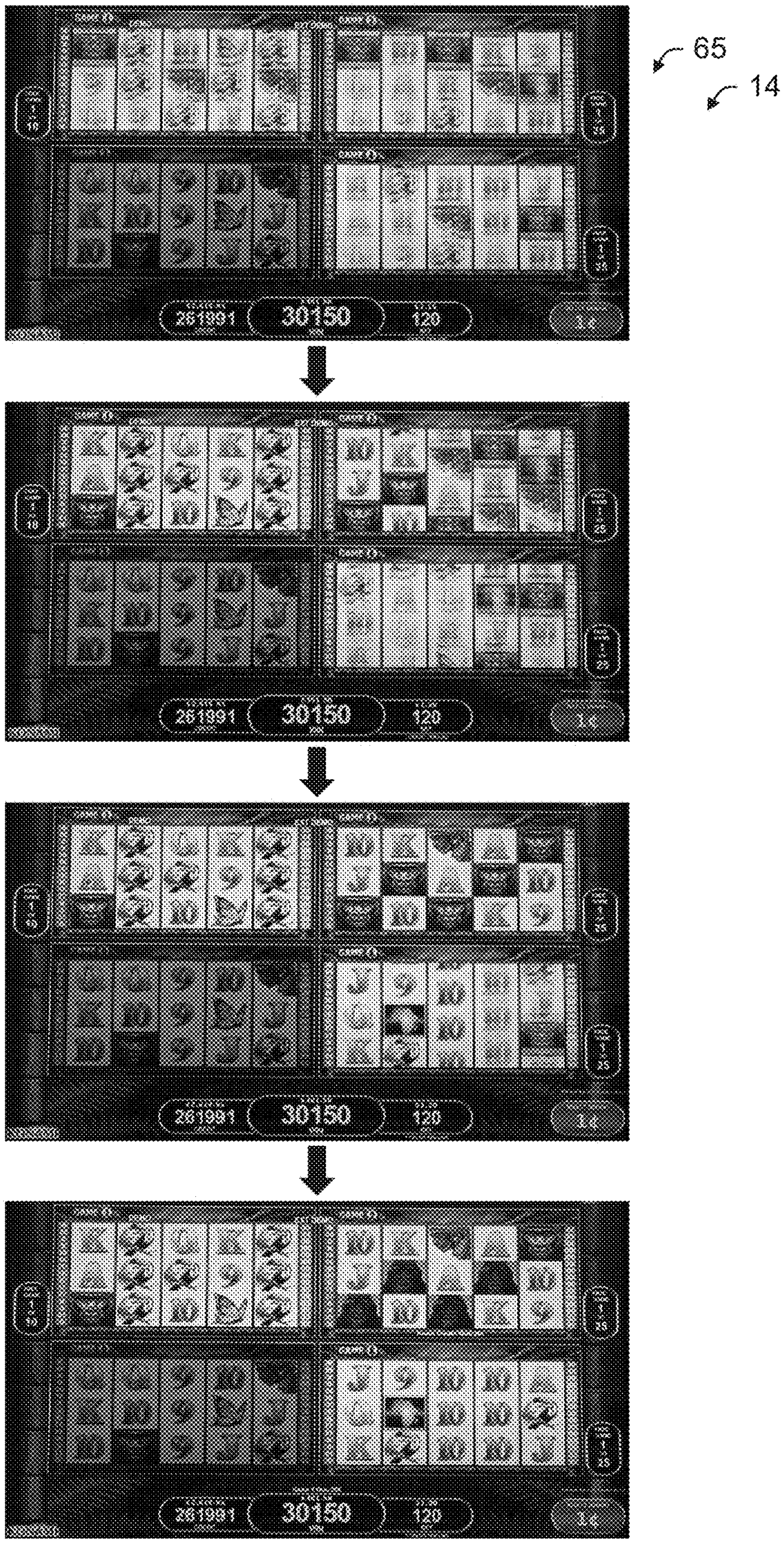

In method step 506, the processor 38 initiates the free games by spinning and stopping the reels of each bonus feature game for each associated game and determines an award associated with the outcome of the instance of the bonus feature game. In some embodiments, as shown in FIG. 21, the processor 38 may initiate an instance of a bonus feature game in each game by randomly selecting an outcome of each instance of the bonus feature games, (i.e., a free game played in Game 1, Game 2, Game 4), spin the reels in each of the games (i.e., spin the reels in Game 1, Game 2, Game 4), and stop the reels of each game to display the outcome each instance of the bonus feature games of Game 1, Game 2, and Game 4 in sequential order. Upon stopping the reels in each of the games and displaying the outcome of the current bonus feature games, the processor 38 then determines the number of remaining bonus feature games, (e.g., remaining number of free games). During each bonus feature game, the processor 38 may award credit prizes, award multipliers, bonus symbols, additional bonus features, additional free games, etc.

In method step 508, the processor 38 determines whether the number of remaining bonus feature games associated with a corresponding game is greater than, or equal to, a predefine number of bonus feature games. For example, the processor 38 may determine whether the number of remaining free games to be played with Game 1 is greater than, or equal to, a predefine number of bonus feature games. Similarly, the processor 38 determines whether the number of remaining free games to be played with Game 2 is greater than, or equal to, a predefine number of bonus feature games, and determines whether the number of remaining free games to be played with Game 4 is greater than, or equal to, a predefine number of bonus feature games.

If the processor 38 determines that the number of remaining bonus feature games in any one of the games is less than a predefine number of bonus feature games, the processor 38 returns to methods step 506 and initiates another instance of the bonus feature games.

Figure 23:

If the processor 38 determines that the number of remaining bonus feature games in any one of the games is greater than, or equal to, a predefine number of bonus feature games, the processor 38 proceeds to methods step 510 and displays a QuickPlay feature icon 118 (shown as "QuickPlay" in FIG. 23) on the game screen 65. For example, if the processor 38 determines the number of free games remaining in any one of Game 1, Game 2, or Game 3 is greater than, or equal to, a predefine number of free games (e.g., greater than, or equal to, 50 free games), the processor 38 displays a QuickPlay feature icon 118 on the game screen 65. The QuickPlay feature icon 118 is selectable by the player and indicates the availability of the QuickPlay credit award feature 120 (shown in FIGS. 24-26).

In method step 512, during each instance of the bonus feature games, the processor 38 determines whether the player has selected the QuickPlay feature icon 118 to initiate the QuickPlay credit award feature 120. If the player does not select the QuickPlay feature icon 118, the processor 38 returns to method step 506 to continue to play the instances of the bonus feature games and continues to display the QuickPlay feature icon 118 as long as the number of remaining bonus feature games in any one of the games is greater than, or equal to, a predefine number of bonus feature games. Upon detecting the player's selection of the QuickPlay feature icon 118, the processor 38 executes methods steps 514-518 to execute and display the QuickPlay credit award feature 120.

In method step 514, upon detecting the player's selection of the QuickPlay feature icon 118, the processor 38 initiates the QuickPlay credit award feature 120 by determining a credit award range associated with the remaining bonus feature games for each game. For example, if the player has remaining free games in each of Game 1, Game 2, Game 3, and Game 4, the processor 38 will determine a credit award range for each of Game 1, Game 2, Game 3, and Game 4.

In one embodiment, the processor 38 determines a credit award range by determining an expected credit award value based on the remaining bonus feature games and multiplying the expected credit award value by a plurality of credit multipliers. For example, the processor 38 may determine the expected credit award value using the following equations:

$$CV_E = FG_E \times CV_{avg}; \text{ and} \quad \text{Equation (1):}$$

$$FG_E = FG_R + (FG_R \times FG_{Add}); \quad \text{Equation (2):}$$

where: $CV_E$=Expected Credit Value;

$FG_E$=Expected Number of Free Games;

$CV_{avg}$=Average Credit Award Value per Free Game $FG_R$=Remaining Number of Free Games; and $FG_{Add}$=Expected Number of Additional Free Games (may be expressed as a ratio of expected free games per 100 games).

In an example where the number of bonus feature games included with Game 1 equals fifty remaining free games (i.e., $FG_R$=50 games) and the expected number of additional free games is 10 free games per 100 free games (i.e., $FG_{Add}$=10/100=0.1), the processor 38 will determine the expected number of free games to equal 55 free games (i.e., $FG_E=FG_R+(FG_R \times FG_{Add})=50+(50\times0.1)=50+5=55$). Where the average credit award value per free game is equal to 404.55 credits (i.e., $CV_{avg}$=404.55), the processor 38 will determine the expected credit value for the remaining bonus feature games to equal 22,250 credits (i.e., $CV_E=FG_E\times CV_{avg}$=55×404.55=22,250 credits).

The processor 38 may then access a credit range data file 122 (shown in FIG. 16) that includes a plurality of credit award multipliers associated with a credit award range 124 (shown in FIG. 24) including a minimum credit award 126 and a maximum credit award 128, and determine a credit award range by multiplying the expected credit value for the remaining bonus feature games by each of the plurality of multipliers. The processor 38 may determine the credit award range to include a minimum credit award 126 equal to the expected credit value, $CV_E$, multiplied by the minimum credit award multiplier 130, and include a maximum credit award 128 equal to the expected credit value, $CV_E$, multiplied by the maximum credit award multiplier 132. In this example, the processor 38 determines the minimum credit award 126 to be equal to 2225 credits (i.e., minimum credit award=$CV_E$×0.1=22,250×0.1=2225 credits) and determines the maximum credit award 128 to equal 63190 credits (i.e., maximum credit award=$CV_E$×2.84=22,250×2.84=63,190 credits).

In method step 516, after determining the credit award range 124 for each game that includes remaining bonus feature games, the processor 38 displays a QuickPlay credit award selection screen 112 that includes a plurality of player selectable game icons 134 associated with each game (i.e., Game 1, Game 2, Game 3, and Game 4) and a player selectable QuickPlay credit award icon 136. The QuickPlay credit award selection screen 112 allows the player to select one or more active games (e.g., games having a remaining number of bonus feature games or free games) and exchange the remaining number of bonus feature games included in the selected games for a credit award that is randomly selected from the credit award range 124.

In the illustrated embodiment, the processor 38 animates the QuickPlay credit award selection screen 112 onto the game screen 65 to overlay at least a portion of each game area 67. For example, as shown in FIG. 24, the processor 38 renders an image of the QuickPlay credit award selection screen 112 within a center of the game screen 65 overlaid across a portion of each game area 67 such that QuickPlay credit award selection screen 112 overlays across each game 68. In some embodiments, the QuickPlay credit award selection screen 112 may appear as a window overlaid across a portion of each of the games 68, e.g., Game 1, Game 2, Game 3, and Game 4.

In some embodiments, the QuickPlay credit award selection screen 112 may display a selectable game icons 134 associated with each of the plurality of games, Game 1, Game 2, Game 3, Game 4, and dim, show in grayscale, or otherwise indicate those selectable game icons 134 that are associated with inactive games that do not have any remaining number of bonus feature games of free games.

Figure 25:
Figure 26:
Figure 27:
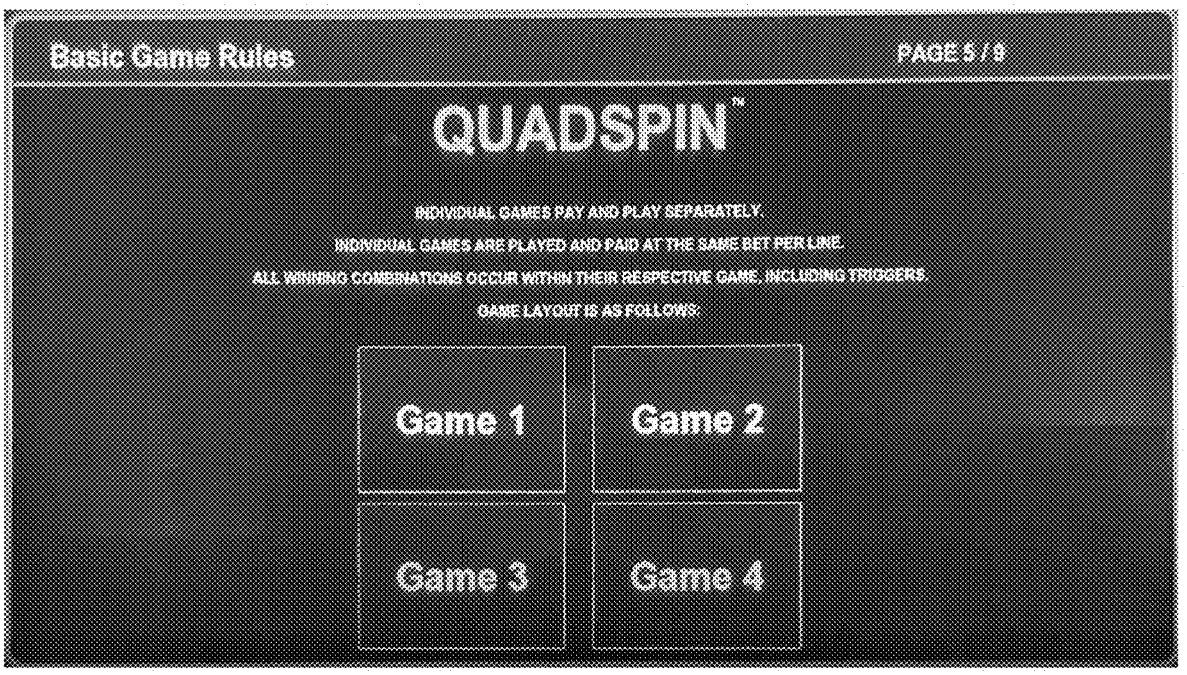
Figure 28:
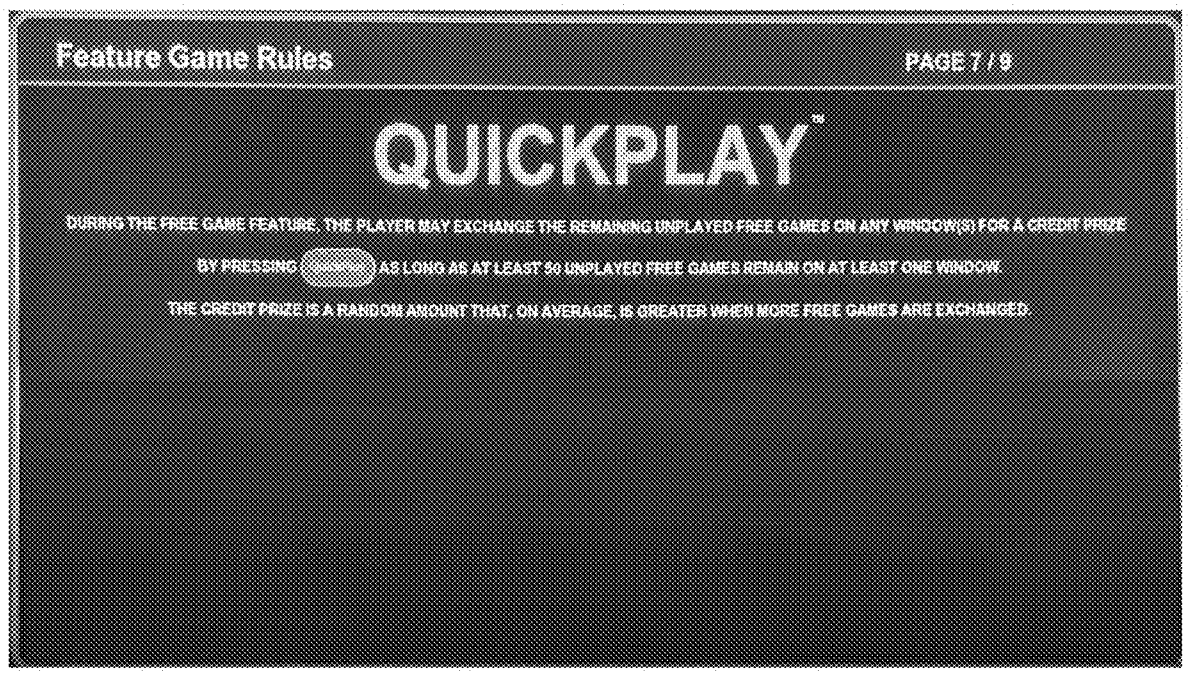

As shown in FIG. 25, the QuickPlay credit award icon 136 displays a current credit award range 124 associated with player selected games. For example, as the player selects a game icon 134, the processor 38 highlights the player selected game icon 134 and increases the current credit award range 124 being displayed QuickPlay credit award icon 136 to add the credit values included in the credit award range associated with the player selected game. The processor 38 initially displays the QuickPlay credit award icon 136 having a current credit award range 124 that includes a credit award range associated with Game 1, including the minimum credit award value equal to 2225 credits and the maximum credit award 128 to equal 63190 credits. As the player selects the game icon 134 associated with Game 2, the processor 38 increases the current credit award range 124 to add the credit award range associated with Game 2, thus increasing the minimum credit award value to 6675 credits and the maximum credit award value to 189570 credits. For example, upon receiving the player's selection of the game icon 134 associated with Game 2 via the touchscreen, the processor 38 determines the current credit award range by determining a total expected credit value of the selected games and multiplying the total expected credit by each of the plurality of multipliers included in the credit range data file 122 (shown in FIG. 16). The processor 38 may determine the total expected credit value by adding the adding the expected credit value for Game 2 to the expected credit value for Game 1 (e.g., Total $CV_E$=$CV_E$ of Game 1+$CV_E$ of Game 2). Similarly, as the player selects the game icon 134 associated with Game 4, the processor 38 increases the current credit award range 124 to add the expected credit value associated with Game 4, thus increasing the minimum credit award value to 8900 credits and the maximum credit award value to 252760 credits.

In method step 518, upon detecting the player selection of the QuickPlay credit award icon 136, the processor 38 randomly selects a credit award from the current credit award range 124 and displays a celebration screen 138 (shown in FIG. 26) that includes the randomly selected credit award being provided to the player. In some embodiments, the processor 38 may acquire a random number and access the credit range data file 122 to select the credit award based on the weights and/or selection probabilities included in the credit range data file 122 and the acquired random number. The processor 38 then animates the celebration screen 138 onto the game screen 65 to display the randomly selected credit award (e.g., shown as "TOTAL WON 8900 CREDITS" in FIG. 26. In some embodiments, the processor 38 may render the QuickPlay credit award selection screen 112 to include a player selectable cancel icon 140 that allows the player to cancel the QuickPlay credit award feature 120 and initiate the remaining number of free games. For example, upon selection of the cancel icon 140 by the player, the processor 38 removes the QuickPlay credit award selection screen 112 from the game screen 65 and begins to animate the reels in each of the active games (e.g., games having a remaining number of bonus feature games or free games) to sequentially spin and stop to display the outcomes of the remaining free games.

For example, in the illustrated embodiment, the processor 38 is programmed to execute an algorithm to display an animated sequence of computer-generated images on the display device including the steps of rendering a plurality of games 68 on a game screen 65, each game including a plurality of virtual reels 70 to 78, and animating each of the plurality of virtual reels 70 to 78 to spin and stop to display an outcome of each corresponding game. The processor 38 then displays a credit award feature 120 by determining a number of free games associated with each corresponding game, determining a credit award range based on the associated number of free games, and animating a credit award selection screen 112 onto the game screen 65 overlaid across a portion of each corresponding game 68. The credit award selection screen 112 includes a selectable credit award icon displaying the determined credit award range.

The processor 38 may also be programmed to display the credit award feature upon determining the number of free games associated with each corresponding game is greater than a predefined number of free games.

The processor 38 may also be programmed to determine an expected credit award value based on the associated number of free games, and multiply the expected credit award value by a plurality of credit multipliers to determine the credit award range. The processor may also determine an expected number of free games based on a remaining number of free games and an expected number of additional free games, and multiply the expected number of free games by an average credit award value per free game to determine the expected credit award value. The processor 38 may then randomly select a credit award from the determined credit award range upon receiving a player's selection of the selectable credit award icon via the touchscreen, and animate a celebration screen 138 onto the game screen 65 displaying the randomly selected credit award.

In some embodiments, the processor 38 may render the credit award selection screen 112 including a plurality of player selectable game icons associated with each game, receive a player's selection of one or more games via the player selectable game icons, determine an expected credit award value associated with each player selected game, and determine the credit award range based on the determined expected credit award values.

The processor 38 may also be programmed to render the credit award selection screen including a player selectable cancel icon 140, and remove the credit award selection screen from the game screen upon receiving a player's selection of the player selectable cancel icon 140 and animate the virtual reels 70 to 78 to sequentially spin and stop to display outcomes of remaining free games.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine, comprising:

a cabinet;

a display device mounted to the cabinet, the display device including a touchscreen; and a game control unit operably coupled to the display device, the game control unit including a processor programmed to execute an algorithm to display an animated sequence of computer-generated images on the display device including the steps of:

rendering a plurality of games on a game screen, each game including a plurality of virtual reels;

animating each of the plurality of virtual reels to spin and stop to display an outcome of each corresponding game; and displaying a credit award feature by:

determining a number of free games associated with each corresponding game;

determining a credit award range based on the associated number of free games;

animating a credit award selection screen onto the game screen overlaid across a portion of each corresponding game, the credit award selection screen including a selectable credit award icon displaying the determined credit award range and a player selectable cancel icon; and removing the credit award selection screen from the game screen upon receiving a player's selection of the player selectable cancel icon and animate the virtual reels to sequentially spin and stop to display outcomes of remaining free games.

2. The gaming machine of claim 1, wherein the processor is programmed to execute the algorithm including the steps of:

determining an expected credit award value based on the associated number of free games; and multiplying the expected credit award value by a plurality of credit multipliers to determine the credit award range.

3. The gaming machine of claim 2, wherein the processor is programmed to execute the algorithm including the steps of:

multiplying an expected number of free games by an average credit award value per free game to determine the expected credit award value.

4. The gaming machine of claim 3, wherein the processor is programmed to execute the algorithm including the steps of:

determining the expected number of free games based on a remaining number of free games and an expected number of additional free games.

5. The gaming machine of claim 1, wherein the processor is programmed to execute the algorithm including the steps of:

randomly selecting a credit award from the determined credit award range upon receiving a player's selection of the selectable credit award icon via the touchscreen; and animating a celebration screen onto the game screen displaying the randomly selected credit award.

6. The gaming machine of claim 1, wherein the processor is programmed to execute the algorithm including the steps of:

rendering the credit award selection screen including a plurality of player selectable game icons associated with each game;

receiving a player's selection of one or more games via the player selectable game icons;

determining an expected credit award value associated with each player selected game; and determining the credit award range based on the determined expected credit award values.

7. The gaming machine of claim 1, wherein the processor is programmed to execute the algorithm including the steps of:

displaying the credit award feature upon determining the number of free games associated with each corresponding game is greater than a predefined number of free games.

8. A method of operating a gaming machine including a display device mounted to a cabinet and a game control unit including a processor operably coupled to the display device, the display device including a touchscreen, the method including the processor performing an algorithm to display an animated sequence of computer-generated images on the display device including the steps of:

rendering a plurality of games on a game screen, each game including a plurality of virtual reels;

animating each of the plurality of virtual reels to spin and stop to display an outcome of each corresponding game; and displaying a credit award feature by:

determining a number of free games associated with each corresponding game;

determining a credit award range based on the associated number of free games;

animating a credit award selection screen onto the game screen overlaid across a portion of each corresponding game, the credit award selection screen including a selectable credit award icon displaying the determined credit award range and a player selectable cancel icon; and removing the credit award selection screen from the game screen upon receiving a player's selection of the player selectable cancel icon and animate the virtual reels to sequentially spin and stop to display outcomes of remaining free games.

9. The method of claim 8, including the processor performing the algorithm steps of:

determining an expected credit award value based on the associated number of free games; and multiplying the expected credit award value by a plurality of credit multipliers to determine the credit award range.

10. The method of claim 9, including the processor performing the algorithm steps of:

multiplying an expected number of free games by an average credit award value per free game to determine the expected credit award value.

11. The method of claim 10, including the processor performing the algorithm steps of:

determining the expected number of free games based on a remaining number of free games and an expected number of additional free games.

12. The method of claim 8, including the processor performing the algorithm steps of:

randomly selecting a credit award from the determined credit award range upon receiving a player's selection of the selectable credit award icon via the touchscreen; and animating a celebration screen onto the game screen displaying the randomly selected credit award.

13. The method of claim 8, including the processor performing the algorithm steps of:

rendering the credit award selection screen including a plurality of player selectable game icons associated with each game;

receiving a player's selection of one or more games via the player selectable game icons;

determining an expected credit award value associated with each player selected game; and determining the credit award range based on the determined expected credit award values.

14. The method of claim 8, including the processor performing the algorithm steps of:

displaying the credit award feature upon determining the number of free games associated with each corresponding game is greater than a predefined number of free games.

15. A non-transitory computer-readable storage media having computer-executable instructions embodied thereon to operate a gaming machine including a display device including a touchscreen, and a processor operably coupled to the display device, when executed by the processor the computer-executable instructions cause the processor to perform an algorithm to display an animated sequence of computer-generated images on the display device including the steps of:

rendering a plurality of games on a game screen, each game including a plurality of virtual reels;

animating each of the plurality of virtual reels to spin and stop to display an outcome of each corresponding game; and displaying a credit award feature by:

determining a number of free games associated with each corresponding game;

determining a credit award range based on the associated number of free games;

animating a credit award selection screen onto the game screen overlaid across a portion of each corresponding game, the credit award selection screen including a selectable credit award icon displaying the determined credit award range and a player selectable cancel icon; and removing the credit award selection screen from the game screen upon receiving a player's selection of the player selectable cancel icon and animate the virtual reels to sequentially spin and stop to display outcomes of remaining free games.

16. The non-transitory computer-readable storage media of claim 15, wherein the computer-executable instructions cause the processor to perform the algorithm including the steps of:

determining an expected credit award value based on the associated number of free games; and multiplying the expected credit award value by a plurality of credit multipliers to determine the credit award range.

17. The non-transitory computer-readable storage media of claim 16, wherein the computer-executable instructions cause the processor to perform the algorithm including the steps of:

determining an expected number of free games based on a remaining number of free games and an expected number of additional free games; and multiplying the expected number of free games by an average credit award value per free game to determine the expected credit award value.

18. The non-transitory computer-readable storage media of claim 15, wherein the computer-executable instructions cause the processor to perform the algorithm including the steps of:

randomly selecting a credit award from the determined credit award range upon receiving a player's selection of the selectable credit award icon via the touchscreen; and animating a celebration screen onto the game screen displaying the randomly selected credit award.

* * * * *